(12) United States Patent
Leo et al.

(10) Patent No.: US 12,455,493 B2
(45) Date of Patent: Oct. 28, 2025

(54) ACTIVE OPTICAL RESONATOR FOR FREQUENCY CONVERSION

(71) Applicant: UNIVERSITÉ LIBRE DE BRUXELLES, Brussels (BE)

(72) Inventors: Francois Leo, Uccle (BE); Simon-Pierre Gorza, Genval (BE); Nicolas Englebert, Etterbeek (BE)

(73) Assignee: UNIVERSITÉ LIBRE DE BRUXELLES, Brussels (BE)

( * ) Notice: Subject to any disclaimer, the term of this patent is extended or adjusted under 35 U.S.C. 154(b) by 355 days.

(21) Appl. No.: 18/018,137

(22) PCT Filed: Jul. 30, 2021

(86) PCT No.: PCT/EP2021/071378
§ 371 (c)(1),
(2) Date: Jan. 26, 2023

(87) PCT Pub. No.: WO2022/023520
PCT Pub. Date: Feb. 3, 2022

(65) Prior Publication Data
US 2023/0273503 A1    Aug. 31, 2023

(30) Foreign Application Priority Data
Jul. 30, 2020   (EP) .................................... 20188731

(51) Int. Cl.
*G02F 1/39*   (2006.01)
*G02F 1/35*   (2006.01)
(Continued)

(52) U.S. Cl.
CPC ............ *G02F 1/395* (2013.01); *G02F 1/3503* (2021.01); *G02F 1/3513* (2013.01);
(Continued)

(58) Field of Classification Search
CPC .... G02F 1/3503; G02F 1/3513; G02F 1/3536; G02F 1/3558; G02F 1/383; G02F 1/392;
(Continued)

(56) References Cited

U.S. PATENT DOCUMENTS 8,233,807 B2 * 7/2012 Cai ..................... H04B 10/2935
398/154
11,526,331 B2 * 12/2022 Steinle ................... H01S 3/1083
(Continued)

FOREIGN PATENT DOCUMENTS

CN          110806670 A      2/2020
WO          2019191647 A1    10/2019

OTHER PUBLICATIONS

International Search Report from PCT Application No. PCT/EP2021/071378, Nov. 24, 2021.
(Continued)

*Primary Examiner* — Daniel Petkovsek
(74) *Attorney, Agent, or Firm* — Workman Nydegger

(57) ABSTRACT

An optical parametric oscillator and method for generating coherent signal light involve a resonant optical cavity for coherent signal light, and in the cavity a non-parametric gain element for amplifying the coherent signal light to only partially compensate for passive optical roundtrip losses, thereby obtaining lower effective roundtrip losses. A parametric gain element is arranged in the cavity, for converting coherent pump light into coherent signal light through an instantaneous nonlinear optical interaction. The parametric oscillator has means for adjusting an intracavity optical power of the coherent pump light above a threshold value, where the parametric gain is balancing the effective roundtrip losses, thus inducing sustained oscillations of the signal light in the optical cavity. The non-parametric gain element is configured to have a limited non-parametric gain over a gain bandwidth of the parametric gain element, which
(Continued)

is less than the passive optical roundtrip losses in the gain bandwidth.

16 Claims, 9 Drawing Sheets

(51) Int. Cl.
 G02F 1/355 (2006.01)
 G02F 1/383 (2006.01)
 H01S 3/094 (2006.01)
(52) U.S. Cl.
 CPC .......... *G02F 1/3536* (2013.01); *G02F 1/3558* (2013.01); *G02F 1/383* (2013.01); *G02F 1/392* (2021.01); *H01S 3/094003* (2013.01); *H01S 3/094076* (2013.01); *G02F 2203/15* (2013.01); *G02F 2203/48* (2013.01); *G02F 2203/56* (2013.01)
(58) Field of Classification Search
 CPC .. G02F 1/395; G02F 2203/15; G02F 2203/48; G02F 2203/56; H01S 3/094003; H01S 3/094076
 See application file for complete search history.

(56) References Cited

U.S. PATENT DOCUMENTS

| 11,899,339 B2* | 2/2024 | Brinkmann ......... H01S 3/06791 |
| 2009/0041062 A1* | 2/2009 | Liu ....................... H01S 3/0057 372/20 |
| 2015/0015938 A1 | 1/2015 | Kieu et al. |
| 2016/0231640 A1 | 8/2016 | Inoue et al. |

OTHER PUBLICATIONS

Search Report from corresponding European Application No. 20188731.2, Feb. 10, 2021.
McMahon et al., "A fully-programmable 100-spin coherent Ising machine with all-to-all connections," Science, Oct. 20, 2016, 9 pages.
Huang et al., "Temporal soliton and optical frequency comb generation in a Brillouin laser cavity," Optica, vol. 6, No. 12, Dec. 2, 2019, 7 pages.
Ge et al., "Transient Process of Dissipative Soliton Generation in Normal Dispersion Fiber Lasers," 2013 Conference on Lasers and Electro-Optics Pacific Rim, Jun. 30, 2013, 2 pages.

* cited by examiner

ACTIVE OPTICAL RESONATOR FOR FREQUENCY CONVERSION

FIELD OF THE INVENTION

The present invention relates to the field of coherent light sources and more particularly to light sources that are based on intracavity frequency conversion in a nonlinear optical medium.

BACKGROUND OF THE INVENTION

Coherent light sources capable of emitting a large number of wavelengths simultaneously or generating coherent light at wavelengths that are difficult to obtain with conventional laser gain media typically require more sophisticated optical cavities. Much progress has been made with respect to optical frequency comb sources as sources of coherent light that emit at multiple wavelengths. Optical frequency combs have already found numerous applications in optical spectroscopy, telecommunication, metrology, waveform synthesis, and others. Various schemes for generating optical frequency combs have been proposed, among which electro-optical frequency comb generation, mode-locked laser based frequency combs, frequency combs generated by cascaded four-wave mixing, and Kerr frequency comb generation in microresonators.

Mode-locked lasers can be operated in the pulsed regime where they periodically release a fraction of a circulating pulse in the laser cavity. The resulting regular pulse train constitutes a frequency comb in the spectral domain. The energy of the intracavity pulse is restored by phase-insensitive amplification in the laser gain medium after each roundtrip. A stronger amplification gain can in principle compensate for larger resonator losses, including a higher transmission at the outcoupler. For shorter pulse durations, however, resonator losses have to be minimized in order to avoid pulse broadening by the gain narrowing effect. This limits the available output power of spectrally broad frequency combs generated by mode-locked lasers. Moreover, amplified spontaneous noise is added to the circulating pulse each time it is amplified by the laser gain medium, which causes a timing jitter and carrier envelope frequency noise. Complex feedback control system which stabilize the frequency comb generated by the mode-locked laser are often required.

Optical frequency comb can also be generated in passive fiber-based resonators, in which a stable solution of a temporal dissipative cavity soliton exists. Existence of stable dissipative temporal cavity solitons has been demonstrated in the work of Leo et al., Nat. Photonics 4, 471-476 (2010). In Herr et al., Nat. Photonics 8, 145-152 (2014), the formation and existence of stable temporal dissipative cavity solitons has been demonstrated also for high-Q nonlinear optical microresonators. The cavity soliton is maintained over successive resonator roundtrips by coherently transferring energy from a coherent pump beam to the cavity soliton. This energy transfer being a phase-sensitive process, less phase noise is created in respect of optical frequency combs emerging from temporal cavity solitons. A drawback of this solution is that only limited optical output powers can be obtained for the so generated optical frequency comb, because a low-loss resonator of high finesse is needed for the continued propagation of the temporal cavity soliton.

There is a still a need for improved optical cavities which allow an efficient generation and extraction of coherent light of an optical frequency comb.

SUMMARY OF THE INVENTION

It is an object of embodiments of the present invention to provide a device and method for the efficient generation and extraction of optical frequency comb.

It is a further object of embodiments of the present invention to efficiently generate and extract coherent signal light at one or more optical wavelengths that are difficult to obtain with conventional laser light sources.

The above objective is accomplished by a method and device according to the present invention.

In a first aspect the present invention is directed to an optical parametric oscillator which comprises a resonant optical cavity for coherent signal light. The coherent signal light, once generated, is thus allowed to resonate inside the optical cavity, which results in resonance enhancement of the coherent signal light. Disposed in the optical cavity is a non-parametric gain element and a parametric gain element. The non-parametric gain is adapted for amplifying the coherent signal light so that passive optical roundtrip losses of the optical cavity are only partially compensated by the non-parametric amplification process. This yields lower effective roundtrip losses for the optical cavity. The parametric gain element is adapted for converting coherent pump light into coherent signal light by virtue of an instantaneous nonlinear optical interaction and has a parametric gain (spectrum) that is dependent on the intracavity optical power of the coherent pump light. At a threshold value of this intracavity optical power, and beyond, the parametric gain is first balancing, and then exceeding, the effective roundtrip losses in a spectral region occupied by the signal light, whereby sustained oscillations of the signal light are induced in the optical cavity. Meanwhile, the coherent pump light is coherently driving the optical cavity, supplying the necessary energy to maintain the oscillations of the signal light. Furthermore, the non-parametric gain element is configured to have a limited non-parametric gain which, at least over a parametric gain bandwidth associated with the parametric gain element, is less than the passive optical roundtrip losses. The optical parametric oscillator also comprises means for adjusting the intracavity optical power of the coherent pump light at or above the threshold value.

The sustained oscillations may be induced in respect of only one of two orthogonal polarization eigenmodes of the optical cavity, e.g. each longitudinal mode of the optical cavity can contain two orthogonal polarization eigenmodes and a cavity soliton as localized waveform may be excited, or spontaneously form, in a particular superimposition state of the two orthogonal polarization eigenmodes (e.g. including the possibility to only excite the horizontal or vertical polarization state). Here, a polarization eigenmode is understood as a polarization state of the generated signal light that will be the same after one cavity roundtrip (e.g. for the same intracavity position $z=z_0$), even if this polarization state changes during the roundtrip. In some embodiments of the invention, the polarization state of the signal light can therefore change, while it stays constant in other embodiments, e.g. depending on the fiber that is used as waveguide in the optical cavity, e.g. polarization-maintaining fiber or not. Preferably, the coherent pump light that is coherently driving the optical cavity is delivered with a polarization state that is well-aligned, e.g. completely aligned, with the polarization eigenmode of the generated signal light at least at the point where the coherent pump light enters the optical cavity. Nonlinear polarization rotation effects can safely be neglected in all practically relevant implementations of the invention.

In cases in which the sustained oscillations are induced for a particular polarization eigenmode of the optical cavity, it is understood that the aforementioned limiting condition on the non-parametric gain relates at least to that particular polarization mode, but may also be satisfied in respect of the other polarization eigenmode in which no sustained oscillations are induced. Similarly, in cases in which the sustained oscillations are induced for a particular waveguide (eigen)mode and/or propagation direction of the optical cavity, e.g. forward or backward propagating fundamental waveguide mode of a multimode optical waveguide forming the largest optical path of the cavity (e.g. fundamental fiber mode of a multimode optical fiber), it is understood that the aforementioned limiting condition on the non-parametric gain relates at least to that particular waveguide mode and/or propagation direction, but may also be satisfied in respect of the other waveguide modes and/or propagation direction in which no sustained oscillations are induced (e.g. in respect of higher-order waveguide mode or modes if the sustained oscillations of the signal light, e.g. cavity soliton, are confined to the fundamental waveguide mode).

Eventually, in embodiments of the invention in which the generated signal light is partly or entirely composed of a discrete frequency spectrum, e.g. a self-localized dissipative waveform such as a cavity soliton entailing the formation of a frequency comb, it is understood that the aforementioned limiting condition on the non-parametric gain relates at least to that particular discrete frequency spectrum generated, although it may also be satisfied in respect of the frequency bands between two adjacent discrete frequencies of the signal light spectrum, in which no sustained oscillations are induced. In such embodiments, the parametric gain bandwidth associated with the parametric gain element is actually discontinuous and comprises an ensemble of lines with narrow spectral width in the frequency domain. In consequence, the non-parametric gain element may be configured to have a limited non-parametric gain which is greater than the passive optical roundtrip losses in one or more of frequency bands between two adjacent discrete frequencies of the signal light spectrum, thereby causing a further laser oscillation building up in the optical cavity at a frequency that is not overlapping/shared with the discrete frequency spectrum of the signal light, e.g. cavity soliton induced frequency comb. As a result, there is also no parametric gain competition between the further laser oscillation and the signal light within the parametric gain element. In other words, the further laser oscillation is coexisting with the generated signal light without interfering with it, because it occupies a location in frequency space that is not used (occupies) by the discrete spectrum of the signal light. As an illustrative example, one may imagine a lasing peak in coexistence with a dispersive Kerr-type cavity soliton, wherein the lasing peak is relative to a cold cavity mode of the optical cavity and is distinct from (i.e. non-coincident with) the discrete, regularly spaced frequency components of the cavity soliton, e.g. the longitudinal modes composing the excited cavity soliton. This is because the frequency components of the Kerr-type cavity soliton are frequency-shifted (detuned) with respect to the cold cavity modes of the optical cavity as a result of the nonlinear Kerr effect.

More restrictively one may thus require that the non-parametric gain element is configured to have a limited non-parametric gain which, at least for those optical modes of the optical cavity that fall within a parametric gain bandwidth associated with the parametric gain element, is less than the passive optical roundtrip losses for said optical modes of the optical cavity. Here optical modes of the optical cavity relates to specific combinations of one or more of the following modal indices: propagation direction, spatial waveguide eigenmode, polarization eigenmode, frequency mode.

In embodiments of the invention, the intracavity optical power adjustment means relating to the coherent pump light may include one or more of the following:
  a laser source for generating the coherent pump light, capable of adjusting its output power level, an optical amplifier with adjustable optical gain,
  an amplitude modulator or a variable optical attenuator, positioned in a light path of the coherent pump light exterior to the optical cavity,
  an optical input coupler disposed in the optical cavity and having an adjustable input power coupling ratio,
  a variable optical attenuator placed inside the optical cavity.

In embodiments of the invention, the optical cavity may be implemented in free-space (e.g. using folding mirrors, plane/focusing mirror, etc.), in fiber, or in a photonic integrated circuit (e.g. using integrated waveguides), or using combinations thereof, e.g. including fiber-to-free-space coupling sections, fiber-to-integrated waveguide (on chip) coupling section, and free-space-to-integrated waveguide (on chip) coupling section.

It is an advantage of embodiments of the invention that the passive optical roundtrip losses of the optical cavity can be significantly reduced and the effective roundtrip losses of the optical cavity can be very small in the optical bandwidth associated with the converted signal light. This leads to a decrease in the threshold power value of the coherent pump light which determines the onset of the sustained oscillations of the signal light in the optical cavity. In consequence, particular embodiments of the invention may include a short, e.g. tens of millimeters long or less, nonlinear crystal as the parametric gain element, allowing a broader spectral region for which a phase-matching condition for optical parametric down-conversion is fulfilled.

It is an advantage of embodiments of the invention that the effective finesse of the optical cavity can be large, e.g. larger than one hundred, e.g. larger than five hundred, e.g. larger than one thousand, even in the presence of optical components inside the optical cavity, for which an optical insertion loss, or associated roundtrip loss, is not neglectable, e.g. insertion losses larger than 3%, e.g. insertion losses larger than 10%. Embodiments of the present invention successfully accommodate lossy optical components, or additional optical components, inside the optical cavity and compensate the excess losses caused thereby. This allows for more versatile arrangements of the optical cavity, for instance lossy free-space-to-fiber coupling sections or slight misalignments of lenses, mirrors, etc., can be tolerated, or specialty fibers (e.g. highly nonlinear photonic crystal fiber, large mode-area fiber) or integrated waveguides can be incorporated into the optical cavity.

It is an advantage of embodiments of the invention that a larger power splitting ratio can be used for output couplers of the optical cavity, without compromising the effective finesse of the optical cavity. As a result, a more significant portion of the converted, oscillating signal light can be extracted from the optical cavity, e.g. more than 1%, e.g. more than 3%, e.g. more than 10%, leading to a higher external conversion efficiency of the optical parametric oscillator and to higher available output powers of the signal light for a given input power of the coherent pump light, e.g. the slope efficiency for the conversion process is improved. Furthermore, a larger power splitting ratio can be used for output couplers of the optical cavity allows for shorter acquisition times and less noise with respect to a detection of the coherent signal light at the output of the optical cavity.

It is a further advantage of embodiments of the invention that a large effective finesse and a large intracavity optical power are obtainable even with optical cavities that are not impedance matched, i.e. critically coupled.

It is an advantage of embodiments of the invention that the non-parametric gain element is configured to operate below the lasing threshold condition for light located in the gain bandwidth of the parametric gain element and polarized along a polarization eigenmode of the optical cavity, e.g. a preferred polarization axis in an optical cavity that uses polarization maintaining fiber or waveguides, if the optical cavity supports two orthogonal polarization eigenmodes. This prevents intracavity lasing to occur at wavelengths where the parametric conversion of pump light to signal light would be susceptible to gain competition by lasing wavelengths, or where the parametric conversion of pump light to signal light would even cease in the presence of lasing cavity modes.

Hence, embodiments of the invention ensure a reliable and stable conversion of pump light to signal light in the parametric gain element.

In embodiments of the invention, the non-parametric gain element may be configured to operate below the lasing threshold condition also for light located outside the gain bandwidth of the parametric gain element. Yet, in other embodiments of the invention, the non-parametric gain element may be configured to operate above the lasing threshold condition for light located outside the gain bandwidth of the parametric gain element. For such other embodiments lasing modes of the optical cavity may thus be excited at wavelengths that are not contained in the gain bandwidth of the parametric gain element. Alternatively, lasing modes of the optical cavity may be excited within the gain bandwidth of the parametric gain element, but with a polarization state that is different (orthogonal) to the polarization state of the signal light. This ensures that the conversion of pump light to signal light in the parametric gain element is not affected by the presence of the additional lasing mode(s). In fact the presence of one or more lasing modes can be advantageous if they allow the indirect control of the non-parametric gain conferred on the signal light by the non-parametric gain element, e.g. via gain clamping. If the roundtrip losses of the optical cavity are substantially polarization mode independent and/or wavelength independent in the wavelength range separating the signal light and the one or more additional lasing modes, then gain clamping is an efficient way to achieve non-parametric gain values for the signal light amplification that are below the optical cavity roundtrip losses.

A parametric gain element according to embodiments of the invention may comprise a dispersive optical lightguide with quadratic or cubic optical nonlinearity and the coherent pump light is converted into the coherent signal light of a self-localized dissipative waveform, e.g. a dissipative cavity soliton. The self-localized dissipative waveform, and hence the signal light, is then composed of a plurality of frequency teeth which together form an optical frequency comb. The parametric conversion process in the parametric gain element may be a cascaded process, e.g. self-phase modulation and cascaded four-wave mixing, which coherently transfers energy from the pump light to the signal light. The optical lightguide may be configured in the anomalous, i.e. negative, dispersion regime for the signal light and may have cubic optical nonlinearity, e.g. a nonlinear optical fiber or waveguide with Kerr-type nonlinearity, supporting the formation of bright dissipative cavity solitons on a weak cw background. Alternatively, the optical lightguide may be configured in the normal, i.e. positive, dispersion regime for the signal light and may have cubic optical nonlinearity, supporting the formation of dark dissipative cavity solitons carved into a strong cw background, or platicons, i.e. locked fronts between a stable upper and lower solution branch. In yet alternative embodiments of the invention, the optical lightguide may have a quadratic optical nonlinearity (e.g. a non-centrosymmetric crystal or waveguide material), supporting the formation of quadratic dissipative cavity solitons. Quadratic dissipative cavity solitons can be generated in the normal and anomalous dispersion regime by selecting the correct sign for the cavity detuning of coherent pump light.

Having regard to the formation of dissipative cavity solitons, i.e. robust optical pulses that propagate indefinitely in the nonlinear optical cavity, it is noteworthy to distinguish between temporal cavity solitons on the one hand and parametrically driven cavity solitons on the other hand. Although both are phase-locked to a driving laser field and display a typical sech-shaped pulse form, the former are sustained by additive driving, which forms a homogeneous background next to the soliton, whereas the latter are driven through phase sensitive amplification, implemented, for instance, via four wave mixing or three wave mixing and lacks a homogeneous background. A single attractor exists for a fixed amount of detuning and driving power of a temporal cavity soliton that is phase locked to the background, whereas two stable, out-of-phase, solutions may coexist for the parametrically driven cavity soliton.

Moreover, temporal cavity solitons are solutions of the externally driven nonlinear Schrödinger equation with a forcing term that is provided through constructive interference with a driving laser at the soliton carrier frequency. In the frequency domain, the additive driving corresponds to providing energy to a single longitudinal mode. The other modes are sustained by parametric wave mixing as the soliton propagates along the resonator. In contrast thereto, parametrically driven cavity soliton are solutions of the parametrically driven nonlinear Schrödinger equation. They are sustained by the same parametric processes as the temporal cavity solitons, but in this case the driving itself is also parametric. The energy is provided directly from a driving laser to all the longitudinal modes composing the soliton through phase sensitive amplification, which can be implemented in a $\chi(2)$ or $\chi(3)$ medium.

For the preceding embodiments of the invention, the overall dispersion regime of the optical cavity is governed by the dispersive properties of the optical lightguide of the parametric gain element, which may be advantageously tailored. As an alternative thereto, the optical cavity of the optical parametric oscillator may be provided with dedicated dispersion management means, e.g. in cases in which the parametric gain element is only weakly dispersive compared to the individual or compound group velocity dispersion properties of all the other optical components present in the optical cavity. In such alternative embodiments, the dispersion management of the optical cavity can be decoupled from the frequency conversion process in the parametric gain element and individually controlled. The dispersion management means may be realized through the addition of at least one dispersive element into the optical cavity, which is optically coupled to the parametric gain element. As for the preceding embodiments, the parametric gain element comprises a nonlinear optical medium with quadratic or cubic optical nonlinearity, e.g. a nonlinear crystal or waveguide. The at least one dispersive element may be provided as a single dispersive element, e.g. a dispersive grating, prism or lightguide, or as a collection of dispersive elements.

It is an advantage of embodiments after invention that frequency combs associated with a dissipative self-localized waveform as coherent signal light can be extracted more efficiently, which increases the external conversion efficiency of the optical parametric oscillator. A background wave coexisting with the dissipative self-localized waveform may be removed by optically filtering (at the pump light frequency) the output of the optical cavity.

In embodiments of the invention, an optical spectrum of the signal light, e.g. frequency comb, may be centered on the spectrally narrower frequency range occupied by the coherent pump light, e.g. single frequency for cw pump light or a few frequencies for synchronous pump light pulses. The optical cavity is then configured to be resonant also for the coherent pump light. This has the advantage that the coherent pump light is recycled and an intracavity power of the coherent pump light can be strongly enhanced relative to the launched power. This further reduces the threshold power of the coherent pump light at which a stable dissipative self-localized waveform is formed and oscillates in the cavity and also increases the slope efficiency of the parametric conversion process.

Embodiments of the invention may further comprise cavity stabilization means for stabilizing the roundtrip time of the optical cavity. This directly translates into a stabilization of the comb teeth spacing of a frequency comb for embodiments in which the signal light corresponds to a dissipative self-localized waveform. Stabilization means may comprise piezo-actuated reflectors for adjusting a length of the optical cavity and/or a phase shifter disposed in the optical, for adjusting an optical path length of the cavity.

It is an advantage of embodiments of the invention that coherent signal light corresponding to a dissipative self-localized waveform is phase-locked to the coherent pump light. Hence, a stable light source for the generation of the coherent pump light can be used to transfer its phase to that of the frequency teeth of the comb, effectively locking a carrier-envelope offset frequency of the comb. It is an advantage of these embodiments of the invention that coherently driving the optical cavity with the coherent pump light eliminates the need of a further stabilization loop with respect to the carrier-envelope offset frequency if a stable light source for the generation of the coherent pump light is used, e.g. a coherent pump laser locked to an atomic transition or another frequency comb.

A parametric gain element according to embodiments of the invention may comprise a nonlinear optical medium with quadratic optical nonlinearity for converting coherent pump light simultaneously into lower-energy coherent signal light and lower-energy coherent idler light, e.g. via a parametric down-conversion process. Alternatively, a parametric gain element according to embodiments of the invention may comprise a nonlinear optical medium with cubic optical nonlinearity for converting coherent pump light, at a single wavelength or at two different wavelengths, simultaneously into coherent signal light and coherent idler light, e.g. via a four-wave mixing process. Besides, the optical parametric oscillator may be adapted for extracting at least a portion of the coherent idler light from the optical cavity. The optical parametric oscillator may be configured to also output a portion of the coherent signal light, or may be configured to not output the coherent signal light from the optical cavity. The coherent idler light may be generated at an optical wavelength that is difficult to obtain by conventional laser gain media, for instance in the mid-infrared spectral region.

It is an advantage of these embodiments of the invention that coherent idler light can be generated at optical wavelengths which are difficult to obtain with conventional laser gain media.

In some embodiments of the invention the optical cavity may be configured to be resonant for the coherent signal light and also for the coherent pump light, e.g. the optical cavity is doubly resonant. This is more easily obtained for coherent signal light which has an optical wavelength that is close to an optical wavelength of the coherent pump light since optical components disposed in the optical cavity then have similar optical properties in respect of the coherent pump and signal light. A doubly resonant optical cavity has the advantage that the coherent pump light is efficiently recycled for the conversion process into coherent signal light and coherent idler light. This lowers the intracavity power threshold value for the coherent pump light above which sustained oscillations of the coherent signal light are obtained in the optical cavity and also improves the slope efficiency of the conversion process. The non-parametric gain element may be adapted for also amplifying the coherent pump light without reaching the lasing threshold. In consequence, an effective finesse of the optical cavity is also improved for the coherent pump light.

In embodiments of the invention the coherent pump light may be delivered to the optical cavity as a coherent train of pump light pulses. This has the advantage that the conversion process in the parametric gain element is then generating frequency combs for the coherent signal light and the coherent idler light. In particular embodiments of the invention, the parametric gain element and the optical cavity may be arranged to generate coherent signal light and coherent idler light at identical wavelengths, e.g. in a degenerate conversion process. This has the additional advantage that the frequency comb for the degenerate coherent signal and idler light is phase-locked to the optical phase of the coherent pump light.

In embodiments of the invention additional optical gratings may be positioned at an output of the optical cavity to further compress coherent signal light output pulses which are not transform-limited.

In some embodiments of the invention, a further nonlinear optical medium may be placed into the optical cavity, e.g. a Kerr-nonlinear optical fiber coupled to the parametric gain element, to further broaden an optical spectrum of the coherent signal light, and a spectral filtering means may be disposed in the optical cavity to stabilize the spectral broadening by said further nonlinear optical medium. As a result, an optical spectrum of the coherent signal light may be extended beyond the gain bandwidth of the parametric element and much shorter coherent signal light pulses may be obtained.

An optical parametric oscillator according to embodiments of the invention may comprise a second harmonic generating medium in addition to the parametric gain element, wherein the second harmonic generating medium is adapted for generating a further optical frequency comb with center frequency that is twice of a center frequency associated with the self-localized dissipative waveform. Such embodiments have the advantage that the frequency comb associated with the self-localized dissipative waveform can be effectively translated to optical frequencies for which frequency combs are more difficult to realize directly, for instance in the visible range of the electromagnetic spectrum. The second harmonic generating medium may be a periodically poled optical fiber, which is lightweight and compact, and easily incorporated into an all-fiber cavity. Alternatively, the frequency comb associated with the self-localized dissipative waveform can be effectively translated to other optical frequencies by providing the optical cavity with a nonlinear optical medium for sum or difference frequency generation, or a nonlinear optical medium for four-wave mixing, and by also providing an additional optical pump beam that is to be injected into this nonlinear optical medium so that energy for the sum or difference frequency generation process, or the four-wave mixing process is supplied.

An optical parametric oscillator according to embodiments of the invention may further comprise a light source which generates the coherent pump light and a coupling element for directing the coherent pump light into the optical cavity. The light source for generating the coherent pump light may be a continuous-wave (cw) narrowband laser, a linewidth of which is approximately equal to, or smaller than, a resonance linewidth associated with a resonant longitudinal mode of the optical cavity. Narrow-linewidth cw lasers (e.g. fiber lasers, DFB semiconductor lasers) with linewidths ranging from a few kHz to as little as 1 Hz, or below, are commercially available and offer tens of milliwatts of output power. This has the advantage that a high degree of coherence can be transferred from the coherent pump light source to the generated signal light, e.g. signal light composed of a single frequency or a frequency comb. No further amplification of the coherent pump light may be required even for pump light sources with moderate output power, e.g. sub-watt, if the optical cavity is configured to have very low effective roundtrip losses, e.g. if a close matching of the non-parametric gain and the passive optical roundtrip losses is achieved. Alternatively, the light source for generating the coherent pump light may be a pulsed laser which is configured to generate coherent pump light pulses at a repetition rate that corresponds to a roundtrip time of the optical cavity multiplied by a rational number, known as rational harmonic pumping.

In embodiments of the invention, an output of the coherent pump light source may be coupled to an amplifier, e.g. a fiber amplifier, for further amplification of the coherent pump light prior to being coupled into the optical cavity. Such additional amplifiers are preferable low-noise amplifiers, which minimally disturb the good coherence properties of the light source.

An optical parametric oscillator according to embodiments of the invention may include cavity detuning means for adjusting and controlling an amount of detuning of a resonant longitudinal mode of the optical cavity relative to a center wavelength of said coherent pump light. This has the advantage that a cavity detuning parameter can be adjusted and controlled more reliably, for instance a controlled onset of the parametric oscillations for the coherent signal light can be achieved by sweeping the amount of cavity detuning (i.e. cavity detuning parameter).

An optical parametric oscillator according to embodiments of the invention may comprise a phase modulator for modulating a phase of the coherent pump light before entering the optical cavity and/or amplitude modulator for modulating an amplitude of the coherent pump light before entering the optical cavity.

An amplitude modulator can be used to generate a coherent pulse train by modulating a constant pump light output of a cw laser, hence a separate pulsed light source for synchronously driving the optical cavity with coherent pump light can be avoided. A phase modulator can be used to emboss a phase profile onto the coherent pump light prior to injection into the optical cavity. This has the advantage that a temporal location of a self-localized dissipative waveform as coherent signal light resonating in the optical cavity can be more precisely controlled, because the self-localized dissipative waveform aligns itself to a maximum of the phase profile modulated onto the coherent pump light. It also allows to merge more than one circulating self-localized dissipative waveform in the optical cavity into a single self-localized dissipative waveform, thereby ensuring coherent signal light that comprises a signal stable frequency comb.

An optical parametric oscillator according to embodiments of the invention may comprises a rare-earth ion-doped fiber amplifier as the non-parametric gain element. Various ion-doped gain fibers are available, which have different ion composition and doping concentrations. This and the fact that a fiber length can be tailored with high accuracy allows the skilled person to precisely control a spectral gain profile of the non-parametric gain element. In particular, a maximum gain coefficient of the unsaturated spectral gain can be limited to be less than the optical roundtrip losses of the cavity over the gain bandwidth of the parametric gain element. Furthermore, a selection of the length of a gain fiber can take into account depletion effects of the optical excitation source (i.e. the optical pump of the non-parametric gain element) used to optically pump the non-parametric gain element such that the maximum gain coefficient of the spectral gain of the non-parametric gain element becomes insensitive to the pump power of the optical excitation source in the limit of strong optical pumping.

An optical parametric oscillator according to embodiments of the invention may comprise means for adjusting the passive optical roundtrip losses of the optical cavity. Such means include passive optical components which, when inserted into the optical cavity, increase a roundtrip loss thereof, for instance optical couplers, neutral density filters, absorbing filters. However, means for adjusting the passive optical roundtrip losses of the optical cavity may also include actively controllable attenuating elements, e.g. variable optical attenuators. Means for adjusting the passive optical roundtrip losses of the optical cavity are advantageously included into the optical cavity to obtain a fine-tuning of the effective roundtrip losses of the cavity, e.g. if the maximum gain coefficient of the spectral gain of the non-parametric gain element can only be determined with limited accuracy.

An optical parametric oscillator according to embodiments of the invention may be implemented as an all-fiber arrangement or may be implemented as a photonic integrated circuit. All-fiber or photonic integrated circuit implementations of the optical parametric oscillator have the advantage of being more lightweight, more compact, cheaper and less prone to mechanical disturbances, dust and vapor than free-space implementations, which may require a sealed enclosure. They usually are also more safe to operate, e.g. less stray light, diffuse or specular reflections than in free-space which put the user's eye safety at risk. All-fiber implementations of the optical parametric oscillator also allow for an easy use, maintenance (e.g. reduced or no re-alignment), repair, replacement or upgrade of individual optical component disposed in the optical cavity.

Highly efficient nonlinear photonic crystal fibers and/or gain fibers are available for all-fiber implementations, which allow for the design of shorter and hence easier to stabilize optical cavities. Photonic integrated circuit (PIC) implementations of the optical parametric oscillator are very compact and stable, have the potential of being mass-producible and cheap, and may be co-integrated with other devices. Optical nonlinearities can be very strong in integrated photonic waveguides due to the high degree of light confinement, but long optical cavities are generally difficult to obtain than in fiber or free-space. A mixed fiber-PIC implementation may combine the advantages of PICs with the possibility of more extended fiber-coupled cavities and/or the more versatile dispersion management in fiber platforms.

In embodiments of the invention, the optical cavity may be arranged in a linear configuration, e.g. linear resonator, or in a ring configuration, e.g. ring resonator.

In a second aspect, the present invention is directed to a method for generating coherent signal light in an optical cavity. The method comprises the step of providing the optical cavity with coherent pump light, which optical cavity is configured to be resonant for the signal light to be generated. In a further step, coherent pump light is converted into coherent signal light through a parametric optical mixing process. In another step, the coherent signal light is amplified in a non-parametric optical amplification process so that the amplification of the coherent signal light only leads to a partial compensation of the passive optical roundtrip losses of the optical cavity. This step yields lower effective roundtrip losses for the optical cavity. The method further comprises adjusting an intracavity optical power of the coherent pump light above a threshold value. At said threshold value of the intracavity optical power of the coherent pump light, a parametric gain for the parametric optical mixing process is balancing the effective roundtrip losses in a spectral region that is occupied by the signal light, thereby inducing sustained oscillations of the signal light in the optical cavity. In the method, a non-parametric gain for the non-parametric optical amplification process is limited to be less than the passive optical roundtrip losses over a gain bandwidth associated with the parametric optical mixing process.

In a third aspect, the invention is directed to a method for building an optical parametric oscillator according to embodiments of the first aspect. The method comprises providing an existing optical cavity and means for adjusting an intracavity optical power of coherent pump light injectable into the existing optical cavity. The existing optical cavity includes a parametric gain element for converting coherent pump light into coherent signal light through an instantaneous nonlinear optical interaction. A parametric gain of the parametric gain element depends on the intracavity optical power of the coherent pump light such that sustained oscillations of the coherent signal light are induced in the optical cavity above a threshold value of the intracavity optical power of the coherent pump light. A further step of the method comprises obtaining passive optical roundtrip losses of the existing optical cavity in a spectral region that corresponds to a gain bandwidth of the parametric gain element. The existing optical cavity is then upgraded in a further step, wherein upgrading includes inserting a non-parametric gain element for amplifying the coherent signal light and configuring the non-parametric gain element to have a non-parametric gain less than the obtained passive optical roundtrip losses in the spectral region if the existing cavity is without a non-parametric gain element. Else if the existing cavity comprises a non-parametric gain element for amplifying the coherent signal light gain, the step of upgrading includes modifying that non-parametric gain element to have a non-parametric gain less than the obtained passive optical roundtrip losses in the spectral region, or inserting additional attenuation means to modify the obtained passive optical roundtrip losses in the spectral region such that a non-parametric gain of that non-parametric gain element is less than the modified passive optical roundtrip losses in that spectral region. Moreover, the building method comprises the step of adjusting, or providing means for adjusting, a length of the existing optical cavity to make it resonant for the converted coherent signal light.

In embodiments of the invention, the step of obtaining passive optical roundtrip losses of the existing optical cavity may comprise obtaining the passive optical roundtrip losses of the existing optical cavity from a datasheet or calibration file with respect to the existing optical cavity. It may also include measuring the passive optical roundtrip losses of the existing optical cavity, e.g. by injecting light into the existing cavity via an input coupler thereof and measuring a transmission of the existing cavity through this input coupler, or by performing a cavity ring-down measurement, or by inferring the losses from a measurement of the threshold for sustained oscillation of the signal light. Obtaining the passive optical roundtrip losses of the existing optical cavity may also include inferring the passive optical roundtrip losses based on the known optical insertion losses associated with each component of the existing cavity.

A non-parametric gain element for amplifying the coherent signal light may be inserted into enhancement cavities for frequency conversion or optical parametric oscillators without such non-parametric gain element. A non-parametric gain element for amplifying the coherent signal light may be modified in optical cavities of fiber lasers, which typically contain such a non-parametric gain element, but which has large amplification gain to overcome the cavity roundtrip losses and initiate lasing. Modifying the non-parametric gain element for amplifying the coherent signal light may comprise one or more of the following:

reducing a length of the non-parametric gain element, e.g. by cutting off a portion of a gain fiber, introduce additional linear losses relative to the non-parametric gain element, e.g. by attaching a linear loss member, e.g. by inserting lossy splices at one or both ends of a gain fiber, or by varying a coupling ratio of optical input couplers connected to the non-parametric gain element, e.g. varying a coupling ratio of at least one of a pair of wavelength division multiplexing (WDM) coupler modules connected to respective ends of a gain fiber, providing the non-parametric gain element in the existing, primary optical cavity with a further optical feedback path, e.g. by connecting a further lightguide to both ends of a gain fibre, such that a secondary optical resonator is created in addition to the primary existing optical cavity, which shares the non-parametric gain element with the primary existing optical cavity, and such that the unsaturated non-parametric gain of the non-parametric gain element is greater than the passive optical roundtrip losses associated with the secondary optical resonator so that a lasing configuration is obtainable for the secondary optical resonator at a wavelength not comprised by, e.g. located outside, the optical bandwidth of the coherent signal light.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
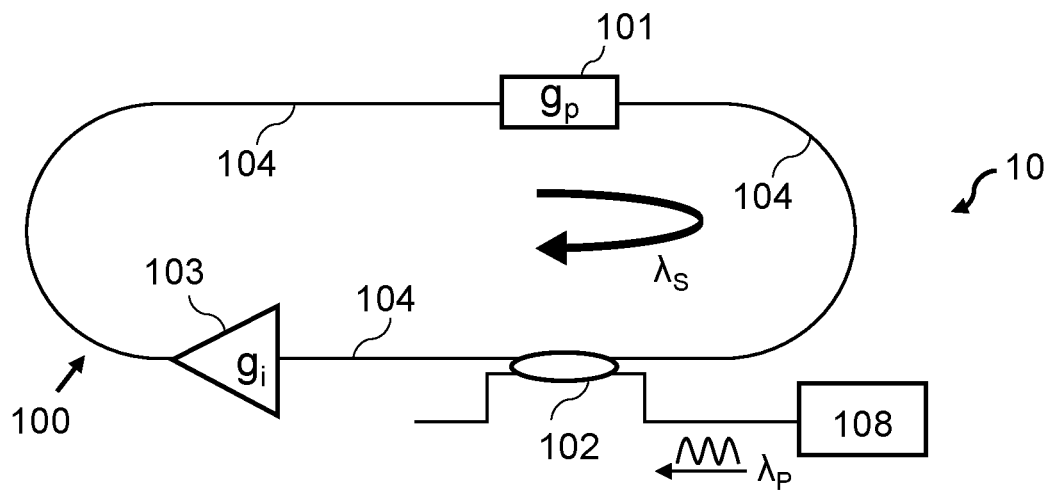
FIG. 1 shows an optical parametric oscillator according to embodiments of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

When reference is made, in the context of the present invention, to an optical cavity that is resonant for an optical wave or light, i.e. a resonant cavity for the optical wave, this is understood to include both the case of an optical wave or light whose frequency is substantially equal to a longitudinal mode of said optical cavity and the case of an optical wave or light whose frequency is detuned with respect to a longitudinal mode of said optical cavity, but still located within a resonance linewidth associated with the longitudinal mode. The former case may be referred to as being at resonance, whereas the latter case may be referred to as being in the vicinity of, or close to, a resonance of the optical cavity. For example, coherent pump light which is close to, but red-detuned with respect to a resonance of the optical cavity is considered to be resonant in the optical cavity in the context of dissipative bright cavity soliton formation in the cavity. Moreover, due to nonlinear optical effects, an optical cavity, when it is actively used, can still be resonant for an optical wave or light having a frequency that is detuned beyond the resonance linewidth associated with the longitudinal mode of the unused optical cavity. This phenomena is often referred to as hot cavity resonance, as compared to the cold cavity resonance for an optical cavity in which the intracavity optical power is too low to induce nonlinear optical effects. An optical wave or light may be multi-resonant, that is an optical or wave comprises, or is composed, of a plurality of optical frequencies, each of which is resonant with respect to a different longitudinal mode of the cavity. This is frequently the case for optical cavities which are driven by a coherent train of pump pulses.

For the purpose of the present invention, the coherence requirement of pump light and signal light is considered to be met if each wavelength of the single or multi-wavelength pump and signal light has a corresponding optical linewidth for which a coherence length is at least on the order of the intrinsic finesse of the optical cavity (i.e. at 0 dB gain for the non-parametric gain element) times the length of the optical cavity.

In the context of the present invention, a non-parametric gain element, in contrast to the parametric gain element, does not involve a nonlinear optical mixing process between light waves of different wavelength content. Moreover, the amplification by the coherent signal light by the non-parametric gain element does not require or depend on the fulfillment of a phase-matching condition between the energy-receiving signal light and an energy-supplying wave, e.g. amplification by the coherent signal light by the non-parametric gain element is not a phase-sensitive process with respect to a possible wave character of the energy supply. A non-parametric gain element, in contrast to the parametric gain element, relies on the principles of population inversion in a gain medium.

For the purpose of the present invention, optical cavity losses and intracavity gain may be expressed in different ways or units, e.g. in percent or decibel. When comparing gain and loss factors, e.g. when deciding on whether a lasing or oscillation threshold is reached, the skilled person is expected to know how to convert these factors so as to be expressed in comparable units. For example, optical cavity losses may be stated as being 30%, but can be equally expressed as 0.3 for the ratio of dissipated optical power per cavity roundtrip versus initial optical power before the roundtrip, as 0.7 for the ratio of conserved optical power per cavity roundtrip versus initial optical power before the roundtrip, or as 1.55 dB of optical losses per cavity roundtrip in decibel. Likewise, an optical gain per cavity roundtrip of 30% may also be expressed as 0.3 for the ratio of added optical power per cavity roundtrip versus initial optical power before the roundtrip, as 1.3 for the ratio of final optical power after the cavity roundtrip versus initial optical power before the roundtrip, or as 1.14 dB of optical gain per cavity roundtrip in decibel. Eventually, comparisons between a gain factor g and a loss factor 1 of the kind g>1, g=1, or g<1, etc., with the common understanding of the gain being greater, equal, or less than loss, are meant to be expressed in decibel, for which gain and loss factors in respect of the optical cavity are additive.

FIG. 1 shows an optical parametric oscillator (OPO) 10 according to embodiments of the invention. An optical cavity 100 of the optical parametric oscillator 10 comprises an optical coupling element 102, a non-parametric gain element 103, and a parametric gain element 101. The coupling element 102 is optically connected to the non-parametric gain element 103, which in turn is optically connected to the parametric gain element 101. The parametric gain element 101 is optically connected to the coupling element 102, thereby providing optical feedback in the optical cavity 10 arranged in a ring resonator configuration. In alternative embodiments, the optical cavity of the parametric oscillator may be arranged in a linear resonator configuration. Coherent pump light $\lambda_p$ for the coherent driving of the optical parametric oscillator 10 is launched into the optical cavity 100 via an input port of the coupling element 102. A means for adjusting an intracavity power 108 of the launched coherent pump light is provided at an input side of the optical cavity 100, meaning that an optical intracavity power of the coherent pump light is adjusted prior to launching into the cavity 100 via the coupling element 102. Although the coherent pump light, when launched into the cavity 100, may be significantly enhanced inside the cavity 100, an enhanced intracavity power in respect of the coherent pump light is still dependent on the launched optical power. Hence, the intracavity power adjustment means 108 for the coherent pump light may be configured to directly adjust a launched optical power of the coherent pump light $\lambda_p$.

Non-limiting examples of the intracavity power adjustment means 108 include a laser source for generating the coherent pump light, capable of adjusting its output power level, an optical amplifier with adjustable optical gain, an amplitude modulator or a variable optical attenuator, positioned in a light path of the coherent pump light incident on the coupling element 102. In alternative embodiments, the intracavity power adjustment means may be provided as an optical input coupler with adjustable input power coupling ratio. In yet other embodiments of the invention, the intracavity power adjustment means may be provided as a variable optical attenuator placed inside the optical cavity, where it adjusts the enhanced intracavity power of the coherent pump light rather than a launched optical power value of the same coherent pump light. As the intracavity power of a narrowband coherent pump light launched into the optical cavity also depends on an amount of detuning from a longitudinal cavity mode, this intracavity power may also be adjusted and/or stabilized by appropriate cavity detuning means as explained further below in this document.

Suitable optical interconnection means 104 between the elements 101, 102 and 103 may comprise light paths extending in free-space, as well as one or more flat or curved mirrors for redirecting, or redirecting and refocusing, the light paths in space (e.g. four mirrors defining a folded light path of the bowtie ring cavity). Alternatively, a portion, or the entirety, of the light paths extending between the elements 101, 102 and 103 may be situated in an optical waveguide, e.g. an optical fiber and/or an integrated optical waveguide of a photonic integrated circuit (PIC). It is thus possible to provide one or more optical waveguides for connecting the elements 101, 102 and 103 among each other. The optical losses relative to the interconnection means 104 and the optical insertion losses (e.g. material absorption and/or interface reflection losses and/or transmission losses) associated with each one of the parametric gain element 101, the coupling element 102 and the non-parametric gain element 103 constitute the optical cavity's total passive optical losses "1", e.g. the (linear) cavity roundtrip losses. In embodiments of the invention, the cavity roundtrip losses are often well approximated as wavelength independent losses in an extended spectral region about the coherent pump light. However, the skilled person is aware that in particular embodiments of the invention, an absorption spectrum associated with the non-parametric gain element or a spectral dependence of the transmittance or reflectance values of some of the optical interconnection means 104, e.g. reflectance of metallized mirrors, transmittance wavelength bands of WDM couplers, transmission window of additional spectral filters inserted into the optical cavity, etc., has to be taken into account to accurately assess the cavity roundtrip losses.

The coupling element 102 is adapted for receiving and injecting narrowband coherent pump light into the optical cavity 100. The coupling element 102 may be provided as an optical fiber coupler in embodiments which make use of fiber-based or fiber-pigtailed components, e.g. in an all-fiber implementation of the optical cavity 100. In other embodiments of the invention, e.g. including light paths that evolve in free space, the coupling element 102 may be provided as cube, plate or pellicle beam splitter, partially reflective mirror, or any other suitable coupling element known for that purpose. In embodiments in which the pump light does not spectrally overlap the coherent signal light, a dichroic mirror, wavelength multiplexer or arrayed waveguide grating (AWG) may be used as coupling element 102. In yet other embodiments of the invention, e.g. in a PIC, the coupling element may be provided as a directional coupler, multimode interference coupler, grating coupler, cleaved waveguide facet, evanescent coupler (e.g. between a waveguide and a microprism), AWG, etc.

Narrowband coherent pump light herein refers to pump light for which a corresponding linewidth is less than, or of approximately equal magnitude as, the linewidth associated with one of the optical cavity longitudinal modes/resonances. It is further noted that this narrowband coherent pump light may be composed of a single optical frequency, e.g. as emitted by a single-mode laser, or may be composed of a plurality of narrowband optical frequencies, e.g. as emitted by a free-running pulsed laser source (e.g. a mode-locked laser source) with stable repetition rate and slowly drifting carrier envelope frequency (e.g. over many cavity roundtrips). The narrowband coherent pump light may be provided by a narrow linewidth pump laser, e.g. a DFB laser having less than 10 kHz linewidth, or may be provided by a broadband laser source whose output is spectrally filtered by a sufficiently narrowband optical filter before being launched into the cavity 100 by the coupler element 102.

The non-parametric gain element 103 is adapted for amplifying, e.g. by a non-parametric gain factor "$g_i$", the coherent signal light $\lambda_s$ that is produced by the parametric gain element 101 to partially, but not completely, compensate the linear cavity roundtrip losses 1. This partial compensation of the cavity roundtrip losses 1 provides an optical cavity 100 with lower effective roundtrip losses "$1_{\mathit{eff}}$" and thus with higher effective finesse. Because of this, not only can optical excess losses, which are due to presence of additional optical components in the cavity or output couplers with a more elevated outcoupling power ratio, be accommodated and compensated by a correspondingly higher gain factor $g_i$, but also the resonant signal light is dramatically enhanced in an optical cavity with a higher effective finesse, e.g. finesse larger than 50, e.g. finesse larger than 75, e.g. finesse larger than 100, e.g. finesse about 120. This leads to a reduction of the threshold value of the intracavity power for the coherent pump light, above which sustained oscillations of the signal light are established. Moreover, a higher portion of the intracavity signal light can be coupled out of the cavity 100, which improves the external conversion efficiency of the optical parametric oscillator 10. In specific embodiments of the invention, the coherent pump light spectrally overlaps a spectrally broader coherent signal light or the optical cavity is configured to be resonant for the coherent pump light too, e.g. a doubly resonant optical cavity. For such specific embodiments, a greatly enhanced intracavity power is also obtained with respect to the resonant pump light and the pump light is efficiently recycled in the optical cavity. This yields a further decreases the aforementioned threshold value.

Besides, the non-parametric gain element 103 is configured to have a limited non-parametric gain $g_i$ over a gain bandwidth of the parametric gain element 101, which is less than the linear cavity roundtrip losses 1 in said gain bandwidth. Consequently, one has $g_i$<1 and light within the gain bandwidth parametric gain element is prevented from undergoing a lasing transition. This condition guarantees that the parametric conversion of coherent pump light into coherent signal light is not perturbed by the presence of lasing modes of the cavity; a spectrally pure and stable coherent signal light is therefore output by the parametric oscillator. In embodiments of the invention, the non-parametric gain element 103 may be configured to have a limited non-parametric gain $g_i$ over a spectral range that is broader than the gain bandwidth of the parametric gain element 101, hence a lasing action related to any cavity mode may be suppressed.

Preferably a self-starting lasing action is suppressed at any wavelength in the optical cavity so that no strong spurious background signals are delivered at an output of the optical cavity. This can be achieved by providing an intracavity spectral bandpass filter, by appropriately designing the gain spectrum associated with the non-parametric and the parametric gain element, and/or by designing the wavelength-dependency of the cavity roundtrip losses 1. If lasing takes place relative to a further, distinct longitudinal mode of the cavity, even if it causes gain saturation, the gain at the longitudinal mode(s) of the cavity for which the converted coherent signal light is resonant is still sufficient to reduce the loss 1 and to achieve low effective cavity roundtrip losses left. Lasing without gain saturation can be realized by means of a non-parametric gain element 103 which comprises again medium in which a gain linewidth is inhomogeneously broadened. Alternatively, lasing with gain saturation but cavity roundtrip loss reduction can be realized by making on purpose a laser at a wavelength well separated from the coherent signal light spectrum to decrease the non-parametric gain on the bandwidth of the coherent signal light below the cavity loss at those wavelengths.

Figure 10:
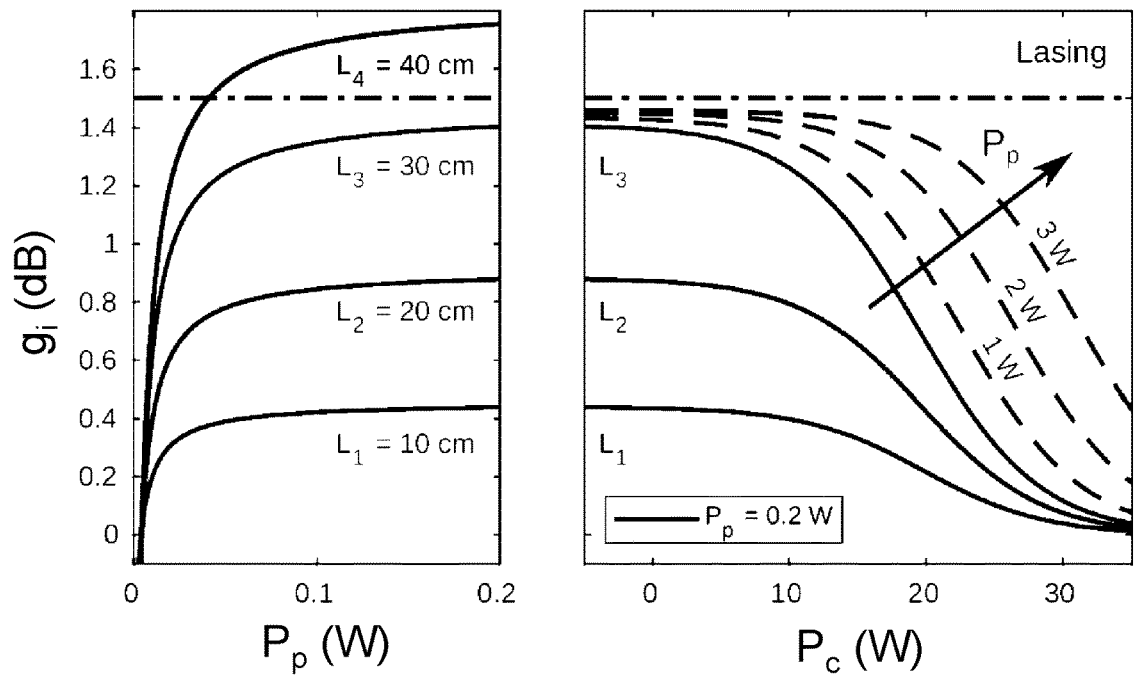
FIG. 10 shows diagrams of a numerical study of the gain of a rare-earth ion-doped fiber amplifier as non-parametric gain element, depending on amplifier length, optical pump power and intracavity power, as can be used in embodiments of the invention.

A non-limiting example of modeling the non-parametric gain factor $g_i$ of the non-parametric gain element 103 is the gain model of a two-level system, given as $g_i = \exp(g_0 L_i)$, wherein $$g_0 = \frac{G_0}{1 + \dfrac{P}{P_{sat}}} \quad \text{(Eq. 1)}$$

and $L_i$ is the length of the gain medium of the non-parametric gain element, $G_0$ is the unsaturated small-signal gain, P is the overall intracavity power received by the non-parametric gain element (e.g. including coherent signal light or coherent signal light and coherent pump light) and $P_{sat}$ the saturation power associated with the gain medium. As the saturation of the gain $g_i$, due to the amplification of the coherent signal light, reduces the gain with respect to the unsaturated gain $\exp(G_0 L_i)$, in order to have a non-parametric gain factor $g_i$ inferior to the cavity roundtrip losses 1, it is sufficient to ensure that the unsaturated gain in decibel, $4.34 * G_0 L_i$, does not exceed the cavity roundtrip losses (in decibel). This should be verified for a non-parametric gain element 103 that is based on population inversion or Raman amplification. The functional relationships between the unsaturated gain $\exp(G_0 L_i)$ and multiple parameters of the non-parametric gain element 103 that determine the unsaturated gain are typically obtained by numerical gain simulations known to the person skilled in the art. By way of example, the skilled person may reduce a doping concentration of rare-earth ions for amplification in a fiber and/or reduce the length of the doped fiber section to limit the unsaturated gain below the optical roundtrip losses of the cavity 100. Moreover, a length of the non-parametric gain element may be determined so that the unsaturated gain is substantially independent of the optical excitation power (e.g. the optical pump for the incoherent gain element) beyond a threshold power value for the optical excitation, e.g. due to depletion effects of the optical excitation caused by the amplified signal light. FIG. 10 shows an example of a numerical simulation of the non-parametric gain $g_i$ of an $Er^{3+}$-doped fiber amplifier as non-parametric gain element, as well as its dependence on amplifier fiber length $L_i$, optical pump power $P_p$ used to excite the atomic levels in the amplifier (on the left), and intracavity power $P_c$ (on the right). It can be seen that the non-parametric gain, for each amplifier fiber length $L_i$ becomes quasi-independent of the optical pump power $P_p$ above a corresponding threshold value of the optical pump power $P_p$. Furthermore, gain saturation of the non-parametric gain by the intracavity optical power $P_c$ is shifted to larger power values if the fiber amplifier is pumped more intensively, i.e. with increasing optical pump power $P_p$.

In embodiments of the invention in which the unsaturated gain is still dependent on the launched power of the optical excitation source (e.g. power of the laser diode used for pumping the doped fiber section/Raman fiber section of the incoherent gain element), however, this launched power may be monitored and limited in an automatized fashion. To this end, the optical parametric oscillator comprising the cavity 100 may include a photodetector for detecting a launched optical power relating to the non-parametric gain element 103, and a control unit operatively connected to the photodetector and to the optical excitation source, or a variable optical attenuator between the optical excitation source and the nonparametric gain element. The control unit may be configured to generate and send control signals in response to the detected launched power, which limit the launched power supplied to the non-parametric gain element 103. Alternatively, a warning message may be generated and displayed to the user on a display, for guiding the user in the correct setting of the optical excitation power supplied to the non-parametric gain element.

Preferably, the saturation power $P_{sat}$ associated with the incoherent gain element 103 is made as large as possible in embodiments of the invention. This enables higher intracavity power levels of the generated signal light and also leads to more intense coherent light being output from the optical cavity. Moreover, a larger saturation power $P_{sat}$ has the advantage that the effect of gain saturation in respect of the non-parametric gain element 103 is mitigated; only intracavity power levels approaching the saturation power $P_{sat}$ will induce gain saturation, thereby increasing the effective roundtrip losses left of the optical cavity 100 again. In this respect rare-earth ion-doped fiber sections present a good choice for the non-parametric gain element 103, because their small transition cross-sections allow for larger saturation powers $P_{sat}$. The skilled person may consider taking additional steps to further increase a saturation power associated with the non-parametric gain element 103. For instance, rare-earth ion-doped fiber sections may be provided as large mode-area fiber sections. Although large mode-area fibers are known to cause optical excess losses when connected to standard fibers, embodiments of the invention have the advantage that these excess losses can be easily accommodated by increasing the non-parametric gain factor $g_i$ accordingly.

The non-parametric gain element 103 may comprise a single localized gain section, a single distributed gain section, or several localized or distributed gain sections arranged along a light path of the optical cavity 100, e.g. a plurality of short amplifying fiber sections. A non-limiting example of a non-parametric gain element 103 comprises a rare-earth ion-doped fiber section, which is optically excitable to achieve population inversion and net positive gain. For instance, an erbium-doped fiber may be provided that is excitable by light at 980 nm or 1480 nm (e.g. delivered by a laser diode). Excitation at 1480 nm has the advantage of increasing the quantum efficiency for the amplification by the non-parametric gain element, and a counter-propagating optical excitation wave $\lambda_e$, relative to the coherent signal light $\lambda_s$, can be used to improve the signal-to-noise ratio. Other non-limiting examples of rare-earth ion-doped fiber sections include erbium-doped fibers of varying host glass compositions, ytterbium-sensitized Er:Yb glass fibers, erbium double-clad fibers, neodymium-doped fibers, thulium-doped fibers, holmium-doped fibers. It is an advantage of rare-earth ion-doped fiber sections that large non-parametric optical gain can be obtained even for short lengths of the doped fiber sections to nearly compensate the passive cavity roundtrip losses 1. Besides, the non-parametric gain can be obtained over a large optical gain bandwidth, e.g.

more than 30 nm of gain bandwidth, and for large saturation powers of the amplified coherent signal light, or amplified coherent signal light and pump light, e.g. more than 100 mW of saturated output power may be delivered by rare-earth ion-doped fiber sections. Other examples of non-parametric gain elements 103 include distributed Raman gain fiber sections, also optically excitable by a suitable laser source, or semiconductor optical amplifiers (SOAs). Distributed Raman gain in optical fibers allow for higher saturation powers of the amplified intracavity light than SOAs and typical rare-earth ion doped fiber sections, whereas SOAs have the advantage that they are very compact and are available in photonic integrated technology platforms, e.g. hybrid III-V on silicon or silicon nitride amplifiers.

The parametric gain element 101 is adapted for converting coherent pump light into coherent signal light through an instantaneous nonlinear optical process. The coherent signal light so obtained comprises one or more new optical frequencies, e.g. signal and idler components at distinct optical frequencies (non-degenerate case) or at identical optical frequencies (degenerate case), or a plurality of frequencies corresponding to the teeth of an optical frequency comb. Further, the parametric gain element 101 is arranged in the optical cavity 100 such that the resonant coherent signal light is parametrically amplified, e.g. by a parametric gain factor $g_p$, during each cavity roundtrip. A nonlinear optical process is considered to be instantaneous if the time scales are shorter than the shortest stable optical pulse obtainable in the optical cavity, e.g. second-order sum and difference frequency generation processes and third-order Kerr-type processes are generally considered instantaneous processes. Parametric amplification of coherent signal light in a coherently driven optical cavity constitutes a coherent transfer of optical power between the pump and the one or more new optical frequencies comprised by the signal light, which depends critically on a relative phase difference between the pump light and the signal light components. To sustain oscillations of the converted signal light in the optical cavity, the parametric gain has to exceed the effective cavity roundtrip losses $1_{\mathit{eff}}$. This condition is expressed mathematically as $g_p > 1_{\mathit{eff}}$. In addition thereto, the parametric gain factor $g_{p,th}$ associated with the parametric gain element at a threshold value of the intracavity power of the coherent pump, by itself, is not sufficient to overcome the linear cavity roundtrip losses, e.g. $g_{p,th} < 1$. Since the parametric gain factor $g_p$ depends on the intracavity power level of the coherent pump light, the intracavity power adjustment means 108 are adapted to provide an intracavity power of the coherent signal light at an input of the parametric gain element, which is sufficiently strong to reach and cross the threshold value. One of the merits of embodiments of the present invention is that this threshold power level of the pump light, which is required for the generation of coherent signal light at one or more new optical frequencies, is significantly reduced for the optical cavity 100, which is based on frequency conversion in power-demanding nonlinear optical mixing processes. Another advantage of embodiments of the present invention is that a larger fraction of the converted coherent signal light can be coupled out of the cavity without negatively affecting the effective quality factor of the optical cavity. This improves the radiance quality of a coherent light source comprising the optical parametric oscillator.

A non-limiting example of modeling the parametric gain $g_p$ for the case of a degenerate optical parametric oscillator with second-order optical nonlinearity consists in solving a system of coupled mode equations for the coherent pump light and the coherent signal light evolving in the optical cavity, which yields $$g_p = 2\kappa L_p \sqrt{P} \qquad \text{(Eq. 2)}$$

with $\kappa$ being the nonlinear coupling parameter (for the conversion of the coherent pump wave into the coherent signal wave), $L_p$ being the length of the second-order nonlinear medium of the parametric gain element and P the non-resonant optical power of the coherent pump light. Numerical simulations and/or physical measurements are often used to derive expressions or numerical values of the parametric gain $g_p$, according to embodiments of the invention.

In some embodiments of the invention, the parametric gain element 101 is provided as a nonlinear optical crystal, e.g. as one of a LBO, BBO, KTP, and KDP crystal known in the art. For such nonlinear optical crystals a quadratic nonlinear interaction converts photons of the pump light into photons of a first and second lower-energy light (e.g. commonly referred to as signal and idler waves). Optical parametric oscillation of at least one of the first and second lower-energy wave as the generated coherent signal light is then obtained if the parametric gain exceeds the effective cavity roundtrip losses. The person skilled in the art is aware of the various critical and noncritical phase-matching configurations available in the art, e.g. may select a crystal material and preferred orientation, polarization states and propagation angle of the pump and signal light relative to the selected crystal orientation, a crystal length, a crystal temperature or poling period, etc., so as to obtain a minimum parametric gain for the coherent signal light for a given threshold power of the coherent pump light and effective cavity roundtrip losses $1_{\mathit{eff}}$. Likewise, the skilled person is experienced to determine a parametric gain bandwidth and wavelength tuneability under which a phase-matching condition for the nonlinear crystal can be met.

The nonlinear crystals may be provided as periodically poled optical fibers or as fiber-pigtailed modules in an all-fiber implementation, which much simplifies their handling and alignment. Bulk chips or waveguide chips comprising one or more nonlinear crystals with second-order optical nonlinearity, e.g. with different poling periods in different waveguides of a same waveguide chip, may be of advantage for photonic integrated optical cavities or more compact fiberized optical cavities. More flexible phase-matching at various polarization configurations and collinear or non-collinear geometries of pump light, first and second lower-energy light may be obtained for a bulk nonlinear crystal disposed in a light path portion of the optical cavity, which is free-space. The nonlinear optical crystal may be periodically poled, e.g. periodically poled lithium niobite (PPLN), lithium tantalate, KTP, MgO doped PPLN, to obtain quasi-phase-matching. The poling period may be controllable by temperature or by spatial translation, e.g. in a fan-type periodically poled crystal.

In other embodiments of the invention, the parametric gain element 101 is provided as a nonlinear optical lightguide or crystal in which a cubic optical nonlinearity, e.g. phase-matched four-wave mixing, converts photons of one or two coherent pump waves into photons of a first and second lower-energy light. For instance, an optical fiber (not restricted to standard single mode fiber, e.g. polarization maintaining fibers, photonic crystal fibers, or highly nonlinear fibers), or integrated optical waveguide with Kerr-type nonlinearity may be used as parametric gain element 101.

An optical lightguide, e.g. fiber or integrated waveguide, may comprise a grating structure for grating-assisted four-wave mixing.

In still other embodiments of the invention, the parametric gain element 101 is provided as a dispersive nonlinear optical lightguide with quadratic or cubic optical nonlinearity, e.g. a dispersive optical fiber or integrated optical waveguide with intensity-dependent refractive index (Kerr effect). In these embodiments, new optical frequencies are generated within the bandwidth of a self-localized dissipative waveform as the coherent signal light. Examples of a self-localized dissipative waveform comprise a bright cavity soliton coexisting on a weaker cw background for an optical lightguide with anomalous dispersion, or a dark cavity soliton carved into a stronger cw background for an optical lightguide with normal dispersion. Quadratic cavity solitons can be obtained for a detuned coherent pump light in optical lightguides with quadratic optical nonlinearity. Moreover, the parametric gain element 101 parametrically amplifies the generated self-localized dissipative waveform by a parametric gain factor $g_p$ per cavity roundtrip, which is effected by a coherent energy transfer between the pump light and the signal light, e.g. the newly generated optical frequencies comprised in the spectrum of the self-localized dissipative waveform. Sustained oscillations of the self-localized dissipative waveform, resulting in the emission of a frequency comb at an output of the optical cavity 100, are then obtained if the parametric gain exceeds the effective cavity roundtrip losses: $g_p > 1_{eff}$. A parametric gain element 101 that comprises a dispersive nonlinear optical lightguide with quadratic or cubic optical nonlinearity demonstrates the possibility of distributed parametric gain, e.g. the parametric gain is obtained over a path length in the optical cavity 100, which can be non-negligible compared to the overall length of the optical cavity, e.g. the parametric gain is obtained over a path length that corresponds to at least 50% of the overall cavity length, e.g. at least 75% of the overall cavity length, e.g. at least 90% of the overall cavity length, e.g. at least 99% of the overall cavity length. In contrast thereto, parametric gain by phase-matched instantaneous frequency conversion in nonlinear optical crystals or lightguides is typically achieved locally, over propagation distances that are significantly shorter than the overall length of the optical cavity, e.g. less than 50% of the overall cavity length, e.g. less than 10% of the overall cavity length, e.g. less than 1% of the overall cavity length, e.g. as little as 0.01% of the overall cavity length. For example, a nonlinear optical crystal of 1 cm length, positioned into a 100 m long optical cavity, corresponds to 0.01% of the overall cavity length.

It is noted that in some embodiments of the invention, a resonance/resonant mode of the optical cavity 100 is tunable relative to a wavelength of the coherent pump light so that the pump light can be brought into resonance, or at least into the vicinity of a resonance. The amount of detuning with respect to the resonance can be adjusted. For instance, a wavelength-tunable laser source may be used to generate coherent pump light at a wavelength that is tunable relative to a resonance of the optical cavity.

In parametric optical oscillators according to embodiments of the invention, the optical cavity is arranged to be coherently driven by the launched coherent pump light, which signifies that the energy supplied by the coherent pump light is transferred to coherent signal light in a phase-sensitive optical mixing process with instantaneous optical nonlinearity, which is induced in the parametric gain element 101. Due to the optical nonlinearity, the optical cavity can be qualified as a nonlinear optical cavity. A parametric gain related to the parametric conversion process is experienced by the resonant coherent signal light. Above a critical threshold value for the intracavity power of the coherent pump light, the parametric gain experienced by the resonant signal light is balancing and exceeding the effective roundtrip losses $1_{eff}$ of the cavity 100, $g_p > 1_{eff}$, thereby inducing sustained oscillations of the coherent signal light in the optical cavity. The optical cavity 100 is thus suited for the generation of at least one new optical frequency. That is one or more optical frequencies of converted coherent signal light will be generated in addition to optical frequencies of coherent pump light, upon launching this coherent pump light into the optical cavity. This will now be briefly explained with respect to several embodiments of the invention.

In particular embodiments of the invention, for instance, an additional optical frequency is generated through the process of optical parametric down-conversion, which takes place in the parametric gain element 101. Consequently, the parametric gain element 101, for these embodiments, comprises a nonlinear optical medium with a quadratic nonlinearity and which is adapted to fulfill the phase-matching condition. Moreover, the optical cavity 100 is resonant for at least one lower-energy wave, i.e. the coherent signal light, that builds up spontaneously from vacuum inside the parametric gain element 101, when supplied with coherent pump light. The optical cavity may be doubly-resonant, i.e. the optical cavity may also be resonant with respect to one or more pump frequencies of the coherent pump light. The pump light can be coupled into the optical cavity 100 via the coupling element 102 as either a continuous wave or as a pulsed waveform with repetition frequency synchronized to the cavity roundtrip time, or a rational multiple thereof. A pulsed supply of the pump wave typically excites a plurality of longitudinal cavity modes. Consequently, one or more further lower-energy waves, i.e. coherent idler light, are co-generated at new optical frequencies in the process of optical parametric down-conversion. The one or more further lower-energy waves are then provided at an output of the optical cavity either as a continuous waveform or as a pulsed waveform. This output of the optical cavity may correspond to a different port of the coupling element 102, e.g. a free port which is not used to couple the pump light into the cavity, or may correspond to a separately provided output coupler, e.g. an output coupler that is adapted to extract the further lower-energy wave (idler light). The signal light may not be extracted from the optical cavity 100, or may be partially extracted from the cavity.

In other embodiments, an additional optical frequency is generated through an optical four-wave mixing (FWM) process, which takes place in the parametric gain element 101. Consequently, the parametric gain element 101, for these embodiments, comprises a nonlinear optical medium with a cubic nonlinearity and is adapted to fulfill the phase-matching condition. The optical cavity 100 is then resonant for at least one signal wave that builds up from vacuum fluctuations inside the parametric gain element 101 when supplied with coherent pump light. Coherent pump light at a single pump frequency may be provided to the optical cavity if degenerate FWM takes place, whereas coherent pump light may comprise first and second pump frequencies if non-degenerate FWM occurs. As previously described, the coherent pump light can be coupled into the optical cavity 100 via the coupling element 102 as either a continuous wave (cw) or as a pulsed waveform with repetition frequency synchronized to the cavity roundtrip time, or a rational multiple thereof. Consequently, a further wave at a new optical frequency is co-generated in the process of FWM and provided at an output of the optical cavity either as a continuous or as a pulsed waveform.

In still other embodiments of the invention, a plurality of additional optical frequencies are generated as teeth of a frequency comb associated with a dissipative self-localized waveform, e.g. a dissipative bright or dark cavity soliton, which is generated and circulates inside the optical cavity 100. Consequently, the parametric gain element 101, for these embodiments, comprises a dispersive nonlinear optical medium with a quadratic or cubic nonlinearity (e.g. Kerr-type) and is adapted to coherently transfer energy between coherent pump light and the dissipative self-localized waveform co-propagating with the pump light along the dispersive parametric gain element 101. Moreover, the optical cavity 100 is resonant (but not necessarily exactly at resonance) for the spectrally broad signal light and the spectrally narrower pump light at which the signal light is centered. The pump light can be coupled into the optical cavity 100 via the coupling element 102 either a continuous wave (cw), as a phase-modulated and/or amplitude-modulated continuous wave, or as a pulsed waveform with repetition frequency synchronized to the cavity roundtrip time, or a rational multiple thereof.

The optical cavity 100 has been described in very general terms and focuses on the characteristic elements of the invention. It is an advantage of embodiments of the invention that various additional optical components can be accommodated in the optical parametric oscillator cavity and the non-parametric gain, afforded by the non-parametric gain element, be adjusted to partially compensated for the additional cavity roundtrip losses caused by the various additional components. Non-limiting examples of particularly useful optical components that can be added in the OPO cavity are one or more of the following: phase modulator, e.g. for implementing a phase profile onto coherent pump light pulses or onto a cavity soliton, amplitude modulator, pulse shaper, e.g. for preparing self-localized structures with a particular shape, high-loss highly nonlinear fibers (HNLF, including photonic crystal fibers) or fiberized components (including chirped fiber Bragg gratings, for example), free-space sections and related couplers, saturable absorber. An intracavity phase modulator may also be used to introduce a synthetic frequency dimension into the dynamic system that is coherently driven nonlinear resonator, whereby the resulting one-dimensional photonic lattice acts as an artificial optical potential on the coherent signal light in the cavity. This enables, inter alia, the preparation and study of coherent temporal cavity solitons or band solitons in the lattice. The skilled person will appreciate that the above-described general cavity can be modified in various way to satisfy the additional requirements of more specific embodiments described hereinbelow.

Figure 2:
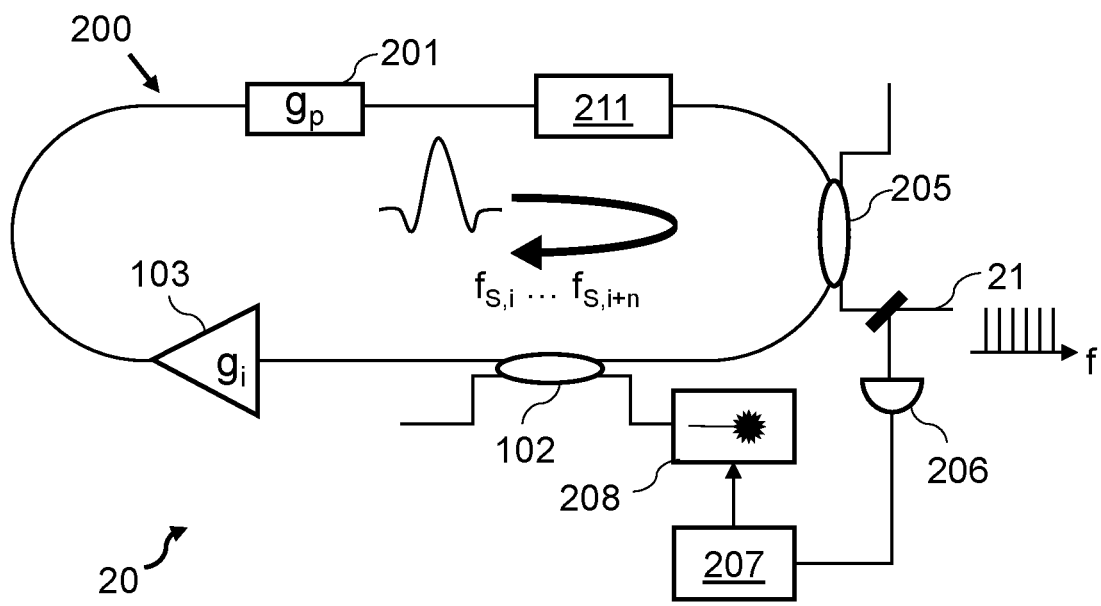
FIG. 2 shows a more detailed optical parametric oscillator according to embodiments of the invention.

Reference is now made to FIG. 2, which shows an optical parametric oscillator 20 comprising an optical cavity 200. The optical cavity 200 is a more specific implementation of the cavity 100 of the embodiment relating to FIG. 1 and is directed to the generation of a self-localized dissipative waveform as signal light. Although a signal wave circulating in the cavity 200 is depicted as a bright soliton for illustrative purposes, this is a non-limiting feature of the present embodiment. The skilled person appreciates that also dark solitons, quadratic cavity solitons, and other self-localized waveforms may be generated in the cavity 200, depending on the dispersion regime of the cavity and the nonlinear optical characteristics of the parametric gain element 201. The overall dispersion regime, e.g. normally dispersive or anomalous, is set by the dispersion management means 211. The dispersion management means 211 may comprise at least one dispersive element, for instance a single dispersive grating, prism or lightguide, or a collection of dispersive elements, e.g. prism pairs, grating pairs, grisms, ensemble of optical fibers with different group velocity dispersion coefficients.

To obtain the formation of a self-localized dissipative cavity soliton, the parametric gain element 201 may, in exemplary embodiments, comprise a dispersive dielectric lightguide with cubic nonlinearity, e.g. an optical silica fiber with Kerr-type nonlinearity, several meters long and configured in the normal dispersion regime relative to the newly generated optical frequencies comprised in the spectral bandwidth of the bright cavity soliton. In this case, the parametric gain element and the dispersion management means 211 are combined into a single unit. In addition to the first coupling element 102, the optical cavity 200 also comprises a second coupling element 205 for extracting a portion of the converted signal light from the cavity 200, e.g. a portion of the bright cavity soliton. It is observed that the second coupling element 205 plays the role of an output coupler which may have a larger coupling ratio than the first coupling element 102. For instance, the second coupling element 205 may have a outcoupling ratio of 10%, whereas a corresponding ratio of the first coupling element 102 is only about 1%. The optical excess losses per cavity roundtrip that are due to the second coupling element 205 are easily compensated by a larger non-parametric gain $g_i$ of the non-parametric gain element 103. As a result, a higher extraction efficiency of the signal light and a higher external conversion efficiency relative to the power supplied by the pump light are obtained with the optical parametric oscillator 20 in accordance with embodiments of the invention.

The optical parametric oscillator 20 also includes a narrowband laser source 208 for supplying the coherent pump light to the coupling element 102. The narrowband laser source 208 is equipped with output power adjustment means and/or with emission wavelength tuning means so that an intracavity power of the supplied coherent pump light can be adjusted by varying an output power and/or an amount of detuning with respect to a resonant mode of the cavity 200. Furthermore, the optical parametric oscillator 20 includes a photodetector 206 and a control unit 207. The photodetector 206 is optically connected to the second coupling element 205 to detect a fraction of the intracavity power. A detection signal indicative of the intracavity power is supplied to the control unit 207, e.g. PID controller, which is configured to detect changes of the intracavity power. These changes are caused by a detuning of the narrowband pump light relative to a resonance of the optical cavity 200, e.g. resonance detuning due to fluctuations (e.g. thermal or mechanical) in the cavity length, or due to relative wavelength drifts in the light source 208. Further, the control unit 207 is configured to generate an error signal which, when applied to the laser source 208, causes the laser source to tune its emitted pump light frequency back into resonance, or to follow a slowly drifting resonance with a constant amount of detuning, e.g. constant amount of cavity detuning that admits the bright cavity soliton as stable solutions of the mean field Lugiato-Lefever equation (LLE).

Generation of the coherent signal light in the parametric gain element 201 occurs above a power threshold value of the intracavity pump light, e.g. a power threshold value above which bright cavity solitons are stable solutions of the mean-field LLE equation, and may be initiated by either superimposing a strong excitation pulse onto the coherent pump light or by performing a gradual wavelength sweep of the coherent pump light frequency through a corresponding resonance of the cavity 200, e.g. by gradually detuning a pump light frequency from a blue side to a red side of a cavity resonance. The former approach may be achieved by using combining the output of the laser source 208 with a high-power pulse delivered by a further laser source, or by using an amplitude-modulated and amplified portion of the pump light and combine it with the remaining, unmodulated cw portion of the pump light prior to injection into the cavity 200 via the coupler element 102. The latter approach may be achieved by stepping or sweeping the emission wavelength of the laser source 208 over the resonance linewidth of the optical cavity 200, wherein the detection signal of the photodetector 206 may be used by the control unit 207 to monitor a current amount of cavity detuning and to generate appropriate start and stop signals for the wavelength sweep by the laser source 208. Once the self-localized waveform is generated, it performs sustained oscillations in the cavity 200 and a short pulse, corresponding to the extracted portion of the signal wave at the second coupler element 205, is regularly provided at an output 21 of the cavity 200. The occurrence of a regularly pulsating output signal may be detected in a response signal of the photodetector 206 and monitored by the control unit 207.

For a sufficiently stable optical cavity 200, subsequent pulses are delivered at the output 21 at a rate that corresponds to the inverse of the cavity roundtrip time, e.g. the repetition rate, and have a fixed phase relationship, e.g. a linearly evolving offset phase defining a carrier-envelope offset frequency. Hence, the requirements for the generation of a coherent frequency comb at the output 21 of the cavity 200 are met. The spectral bandwidth associated with the self-localized waveform, i.e. the coherent signal light, extends over a plurality of newly generated optical frequencies $f_{Ci}, \ldots f_{C,i+N}$, for which the optical cavity is resonant (hot cavity resonances) and which determine the optical bandwidth of the frequency comb.

Figure 6:
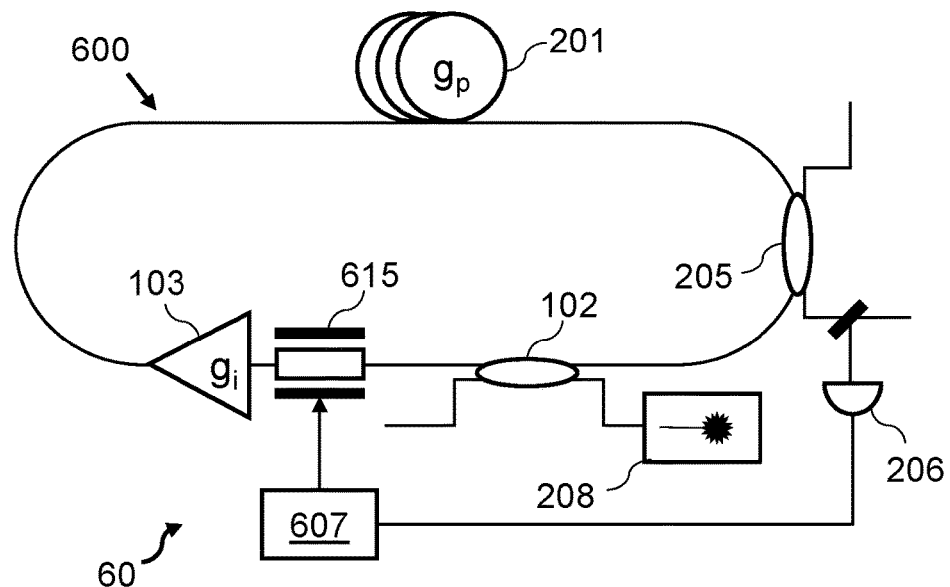
FIG. 6 illustrates means for stabilizing a roundtrip time associated with an optical parametric oscillator in accordance with embodiments of the invention.

An alternative means for stabilizing a resonance of the optical cavity and/or for controlling the amount of cavity detuning, i.e. the frequency offset between a pump light frequency and a corresponding resonant longitudinal mode of the optical cavity, is presented in FIG. 6. The components of the optical parametric oscillator 60 presented in FIG. 6 are the same as for the cavity 200 of FIG. 2, except that the optical cavity 600 further comprises a means 615 for adjusting an optical path length of the optical cavity, e.g. a phase-shifting means or a means for adjusting a cavity length. A fraction of the intracavity light is extracted via the second coupling element 205 of the optical cavity 600 and is detected by the photodetector 206. A detection signal generated by the photodetector 206 is indicative of the intracavity optical power and is sent to a control unit 607, e.g. a PID controller. The control unit 607 generates an error signal which, when applied to an optical path length adjustment means 615, compensates for any deviation from a targeted amount of cavity detuning. Non-limiting examples of intracavity optical path length adjustment means 615 include electrooptic phase modulators, paired acousto-optic modulators, fiber stretchers, or mirror-mounted piezo actuators if part of the cavity 600 is extending in free-space. This way of controlling the amount of cavity detuning is independent of the particular parametric gain element 201, i.e. cavity detuning can be controlled in optical cavities which are configured for frequency comb generation by excitation of a self-localized dissipative waveform or for optical parametric amplification and generation of sum or difference frequency waves in the visible, mid-infrared or far infrared region of the electromagnetic spectrum.

Variants of the present embodiment may comprise distinct elements for the parametric gain element 201 and the dispersion management means 211. For instance, the parametric gain element 201 comprises a nonlinear optical medium with quadratic optical nonlinearity, e.g. a nonlinear crystal or waveguide, which is configured for converting coherent pump light into second harmonic coherent signal light, e.g. via a parametric second harmonic generation process, or half-harmonic coherent signal light, e.g. via a parametric degenerate down-conversion process (degenerate optical parametric oscillator), and the dispersion management means 211 is provided as a dispersive optical waveguide, e.g. as one or more dispersive optical fibers with tailored group velocity dispersion properties. Hence, the dispersion management of the optical cavity 200 can be decoupled from the frequency conversion process in the parametric gain element 201 and individually controlled. For these variants, a cavity detuning, coherent pump light power and group velocity dispersion regime can be selected to convert the coherent pump light into coherent signal light comprising an optical frequency comb, by supporting the formation of self-localized dissipative waveforms, e.g. quadratic dissipative solitons (bright, dark, flat-top, quasi-) or domain wall locking. Domain walls consist of a transitions connecting two different, but coexisting cw states and are particle-like states that can exist separately, interact, and lock forming self-localized dissipative structures, i.e. domains of finite size that are bi-asymptotic to the cw states. The formation of self-localized dissipative waveforms is the result of a cascaded second-order nonlinear optical process, which also occurs if the phase-matching condition is not exactly met. Furthermore, the optical dispersive waveguide of the dispersion management means 211, e.g. optical fiber, may itself have an optical nonlinearity, e.g. a cubic optical nonlinearity. In the resulting optical cavity second-order nonlinear effects and third-order nonlinear effects can act together to enable the generation of solitary pulses as coherent signal light.

Figure 3:
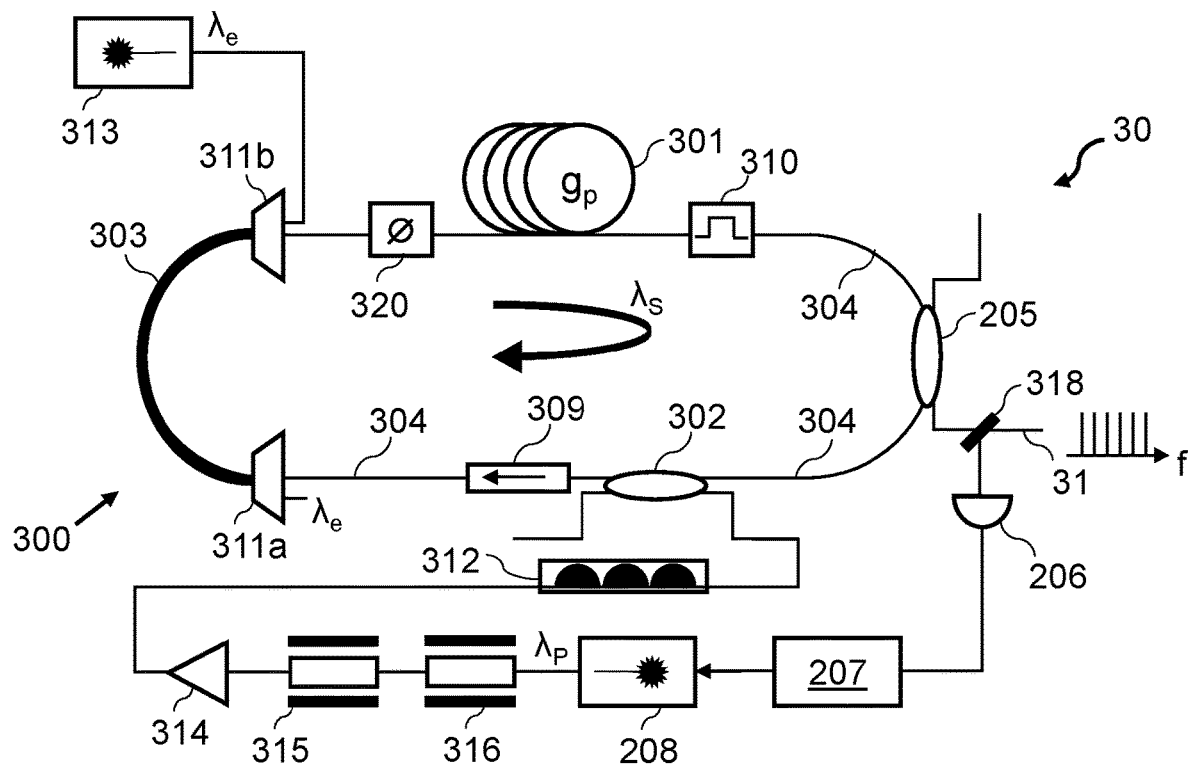
FIG. 3 shows an optical parametric oscillator in accordance with embodiments of the invention, which is configured to convert coherent pump light into coherent signal light comprising an optical frequency comb.

FIG. 3 shows an optical parametric oscillator 30 that is built from an all-fiber optical cavity 300, in accordance with embodiments of the invention. The optical parametric oscillator 30 is configured to generate and output an optical frequency comb. An overall length of an exemplary fiber cavity 300 may be 50.4 m and a corresponding free spectral range may be about 3.97 MHz. The fiber optical cavity 300 comprises a 2×2 input coupler 302 and a 2×2 output coupler 305. The power splitting ratio of the input coupler 302 is selected to be 99:1, that is 99% of the intracavity power incident on the input coupler is reflected back into the cavity and only 1% is removed from the cavity 300. Likewise, only 1% of the pump light incident on the input coupler 302 is launched into the cavity 300, whereas 99% of the pump light incident on the input coupler are rejected and may be directed to a power meter (not shown). Such a power meter may be connectable to the input coupler 302 in order to deduce a launched power of the coherent pump light in the cavity 300. The power splitting ratio of the output coupler 305 is selected to be 90:10, that is 90% of the intracavity power incident on the output coupler is reflected back into and 10% extracted from the cavity 300 to deliver the frequency comb at the output 31, e.g. via a further beam splitting element 318. The respective roles of the input and output coupler may be swapped, e.g. to decrease an optical power of the coherent pump light driving the cavity 300. The further beam splitting element 318 may be used to monitor a fraction, e.g. 1%, of the intracavity power that is extracted by the output coupler 305 in order to provide a feedback mechanism for the amount of cavity detuning as has been previously described. An additional phase-shifting means may be disposed into the optical cavity 300 to independently stabilize the cavity roundtrip time in a manner analogous to FIG. 6.

A pump laser source 208 is adapted for generating coherent narrowband pump light. In particular embodiments of the invention, the laser source 208 is a single-mode cw-laser, e.g. a DFB laser, which emits coherent pump light at about 1550 nm. The particular laser source may have less than 100 Hz linewidth and be wavelength-tunable in a 1 nm region. The coherent pump light supplied by the laser source 208 is sent to an optical amplifier 314, e.g. and erbium-doped fiber amplifier, before being launched into the cavity 300 via the input coupler 302. Optionally, a phase and or amplitude of the coherent pump light may be modulated before the coherent pump light is applied to the input coupler 302. To this end, optical phase modulation means 315 and/or amplitude modulation means 615 may be provided, e.g. electro-optical phase and/or amplitude modulators may be inserted between the laser source 208 and the amplifier 314.

The intracavity power of the coherent pump light may be adjusted by wavelength tuning an emitted wavelength of the laser source 208, by adjusting an optical output power supplied by the laser source 208, by adjusting a depth of amplitude modulation applicable to the pump light via an amplitude modulator 316, by adjusting an optical amplification gain associated with the optical amplifier 314, or by using combinations thereof.

The non-parametric gain element comprises a short rare-earth ion-doped fiber 303, e.g. $Er^{3+}$-doped silica fiber, and is optically excited by another cw laser diode 313 emitting light at $\lambda_e$=1480 nm. A pair of WDM coupler modules 311a-b is provided and connected to both ends of the rare-earth ion-doped fiber 303 to efficiently inject into and remove the optical excitation light from the rare-earth ion-doped fiber 303. An exemplary rare-earth ion-doped fiber may be provided as a 34 cm long $Er^{3+}$-doped silica fiber with a doping concentration equivalent to an unsaturated non-parametric gain per unit of length of approximately 8 dB/cm. Moreover, the impact of gain saturation in the rare-earth ion-doped fiber 303 is limited by using a strong optical excitation light of 1 W at $\lambda_e$=1480 nm. The resulting non-parametric gain is close, but inferior, to the passive roundtrip losses of the optical cavity, which were determined to be 32% in an experimental set-up of the optical parametric oscillator 30.

The parametric gain element 301 comprises a long fiber segment, e.g. much longer as compared to the length corresponding to the lumped components of input and output coupler elements 302, 305, non-parametric gain element 303, and further optional optical component, e.g. including an optical isolator 309, an optical bandpass filter 310 and a variable optical attenuator 320 if present. The parametric gain element may be provided as a 50 m long single-mode silica glass fiber with second-order dispersion coefficient $\beta_2$=−20 $ps^2$/km and cubic nonlinearity coefficient $\gamma$=1 $W^{-1}$ $km^{-1}$. Transverse refractive index profiles of the glass fiber for the confinement of intracavity light along the transverse dimensions may take various shapes, e.g. including triangular refractive index profile, quadratic step-index profile, or parabolic refractive index profile. Shorter optical cavities and higher repetition rates of the frequency comb may be achieved by providing integrated optical cavities on PICs, or by using optical fibers with larger optical nonlinearity (highly nonlinear fiber) as parametric gain element. Alternatively, an intracavity etalon or external etalon can be used to increase the repetition rate of the frequency comb.

It is advantageous to build the optical cavity 300 such that all the lossy optical components and the non-parametric gain element 303 are all lumped together over a short optical path length of the cavity to disturb the cavity soliton dynamics only locally. Most of the reshaping of the temporal cavity soliton then happens while propagating along the much longer parametric gain element 301.

Insertion of the optional optical isolator 309 into the optical cavity 300 may have the additional advantage that back-reflected light is prevented from circulating inside the cavity 300, e.g. back-reflected light corresponding to optical excitation light provided by the additional light source 313, and/or that stimulated Brillouin scattering is inhibited inside the optical cavity. A variable optical attenuator 320 may be beneficial for the purpose of fine-tuning the effective cavity roundtrip losses $1_{eff}$. An additionally bandpass filter 310, e.g. an optical bandpass filter which has a 5 nm wide transmission window centered at about 1550 nm, may be disposed in the light path of the optical cavity 300 to intentionally limit the available gain bandwidth of the non-parametric gain element. This may be used to reduce added amplified spontaneous emission noise on the coherent signal light and/or to prevent a lasing action of the optical parametric oscillator at wavelengths corresponding to a maximum spectral gain amplitude of the non-parametric gain element.

As in the previous embodiments, a feedback system comprising a photodetector 206 and a control unit 207, e.g. a PID controller, is provided to lock the pump light wavelength $\lambda_p$ of the laser source 208 to one of the cavity resonances. This also stabilizes the optical parametric oscillator 30 with respect to wavelength drifts of the laser source 208 and/or drifts of the cavity resonance positions relative to the coherent pump light wavelength. However, it is also possible to lock a cavity resonance to a stable laser source, e.g. by providing optical path length adjustments means similar to what has been taught with reference to the embodiment of FIG. 6.

A resonance linewidth of the optical cavity 300 has been measured at 1 μW laser output power and found to be as narrow as 15 kHz, corresponding to an effective Q-factor of the optical cavity 300 of approximately $1.2*10^{10}$. A 215-fold enhanced intracavity power (e.g. 215 μW) and an effective cavity roundtrip losses of 2.5% were deduced from the measured resonance linewidth. Gain saturation effects were perceptible for intracavity power values of the coherent pump light when they became as large as 300 mW, increasing the effective roundtrip losses to about 15%.

Numerical simulations of the optical cavity 300 predict the formation of a dissipative temporal cavity soliton for intracavity optical powers of the pump light exceeding 9 mW and experimentally confirmed for an intracavity optical powers of the pump light equaling 11 mW and a cavity detuning of 0.5 rad. The verification by experiment revealed the presence of a 1.6 ps long pulse with 21 W optical peak power, which was formed on top of homogenous background of 50 mW average optical power.

A dissipative temporal cavity soliton may be excited in the optical cavity by modulating the amplitude of the coherent pump light so that a single intense optical pulse of coherent pump light, e.g. 250 ps long and 45 W of optical peak power, is launched into the optical cavity in addition to a constant cw contribution of coherent signal light at 110 mW. This may be achieved by setting a bias point of the amplitude modulation means 316 accordingly and applying a 250 ps long electrical pulse to the amplitude modulation means 316, steering it to maximum transmission. Alternatively, cavity soliton formation may be obtained for synchronous pumping of the optical cavity with coherent pump light. Synchronous pumping involves the injection of coherent pump light into a plurality of cavity resonances. An advantage of synchronous pumping is that gain saturation effects with respect to the non-parametric again element can be reduced. For instance, the amplitude modulation means 316 may be configured to repeatedly produce 1 ns long flat-top pulses of coherent pump light through amplitude modulation of the pump light supplied by the laser source 208. A duty cycle for the production of the coherent pump light pulses may be set to 250, in agreement with the cavity roundtrip time of about 250 ns. A periodic phase profile at 3.97 MHz, which is comprising a phase maximum, is applied to the coherent pump light pulses, using the phase modulation means 315. This ensures that cavity solitons are attracted to the maxima of the imprinted phase profile and merge into a single circulating cavity soliton. The phase maximum of the periodically forged phase profile can be locally parabolic and may be generated via a sine-wave generator. As little as 30 µW (750 mW pulse peak power) of average power of pulsed coherent pump light has been found to be necessary to excite a 3.1 ps wide temporal cavity soliton by gradually changing (e.g. at a rate of 0.25 rad/ms) an amount of cavity detuning from an initial positive value (e.g. 0.27 rad) to a negative value (e.g. −0.5 rad), and back to the initial positive value.

Figure 4:
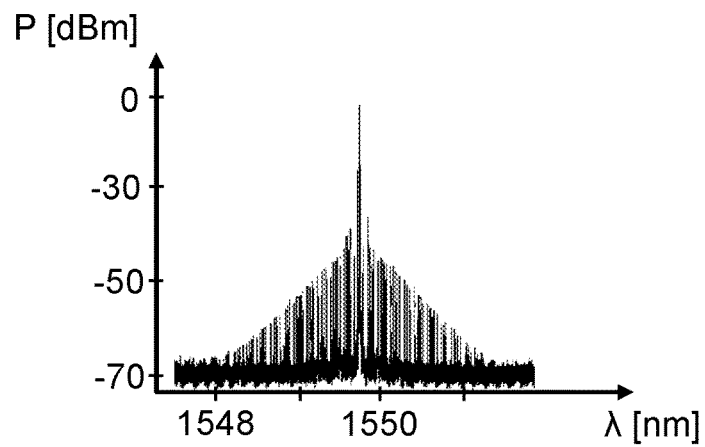
FIG. 4 shows a spectral record of an optical frequency comb generated by the embodiment of FIG. 3.

FIG. 4 shows a recorded optical power spectrum of a frequency comb generated by the optical parametric oscillator 30 of FIG. 3. A plurality of wavelengths, i.e. the individual teeth of the frequency comb, are clearly distinguished and span (10 dB bandwidth) about 2 nm. The shape of the power spectrum corresponds to the one that is expected for bright dissipative temporal cavity solitons. Adjacent teeth are separated by about 4 MHz.

Figure 5:
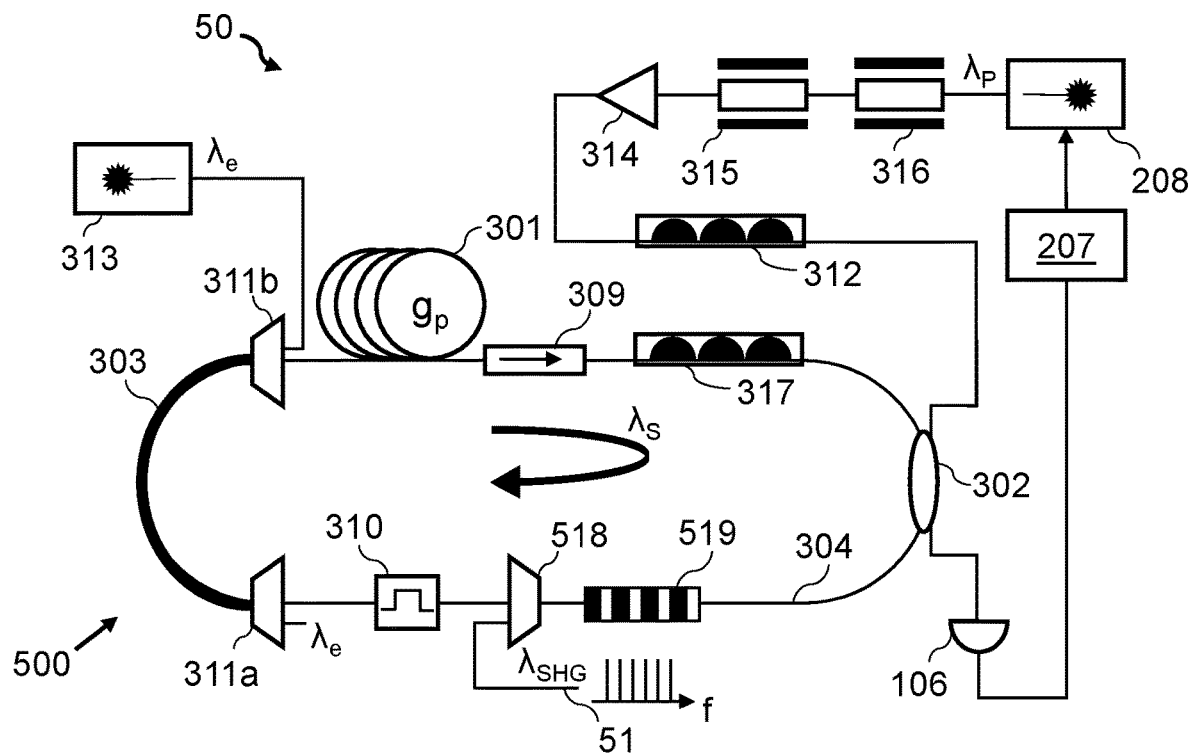
FIG. 5 shows a variant of the embodiment of FIG. 3, which is adapted for generating a frequency-doubled copy of an optical frequency comb comprised by the coherent signal light.

FIG. 5 shows a variant of the embodiment in FIG. 3, in which an optical parametric oscillator 50 comprises nonlinear optical medium 519 for second harmonic generation (SHG). At each round-trip of the dissipative temporal cavity soliton inside the optical cavity 500, the nonlinear optical medium 519 generates a copy of the cavity soliton with a carrier frequency which is twice that of the circulating original cavity soliton. The bright cavity soliton circulating inside the optical cavity 500 makes this frequency doubling process an efficient one. A color-sensitive optical splitter 518, e.g. a dichroic beam splitter, is arranged to receive the frequency-doubled copy of the cavity soliton and couple it out of the optical cavity 500. Hence, a frequency-doubled comb is delivered as source output light 51 of the embodiment presented in FIG. 5. By way of example, a periodically poled fiber or nonlinear integrated waveguide may be provided as nonlinear optical medium 519 to generate a frequency-doubled soliton centered at 775 nm based on a circulating, resonant temporal cavity soliton centered at 1550 nm.

Some tunability of the center frequency of the frequency-doubled comb may be provided by adjusting the emission wavelength of the laser source 208 within the phase-matching bandwidth of the nonlinear optical medium 519 and simultaneously adjusting a wavelength position of the cavity resonance. The latter may be achieved via a feedback-controlled fiber stretcher or phase-shifter insertable into the optical cavity 500. Besides, the phase-matching of the nonlinear optical medium 519 may be adjustable as well, e.g. via heating or by varying a poling period of a quasi-phase matched nonlinear optical medium (e.g. fan-type periodically poled crystal or selection of poled structure with different period provided on a same substrate or carrier). The use of a nonlinear optical medium 519 for second harmonic generation (SHG) has the advantage that no additional light sources for pump laser light emission at a different center wavelength than that of the circulating cavity soliton are required, which reduces costs and complexity of the frequency-doubling oscillator 50. Further, a polarization controlling device 317 has been added into the optical cavity 500 to adjust a polarization state of the coherent signal light before being sent into the nonlinear optical medium 519, wherein frequency conversion is typically achieved in a polarization-sensitive process. The polarization controlling device 317 is not critical in optical cavities which use polarization-maintaining fibers or in which a polarization state of the signal light is determined by the nature of the interconnecting lightguide(s) 304 used to link the various elements of the optical cavity.

However, variations of the present embodiment with regard to optical frequency conversion processes other than SHG, e.g. more general sum frequency generation and four-wave mixing processes, are within the skills of the experienced artisan. Additional pulsed or continuous wave sources of laser light may be provided for that purpose, together with adequate coupling structures for coupling light into and out of the optical cavity, so that laser light at different frequencies is made available for the nonlinear optical frequency conversion process that is exploited in the corresponding nonlinear medium and which is used to translate the originally generated frequency comb to remote center wavelengths.

Figure 7:
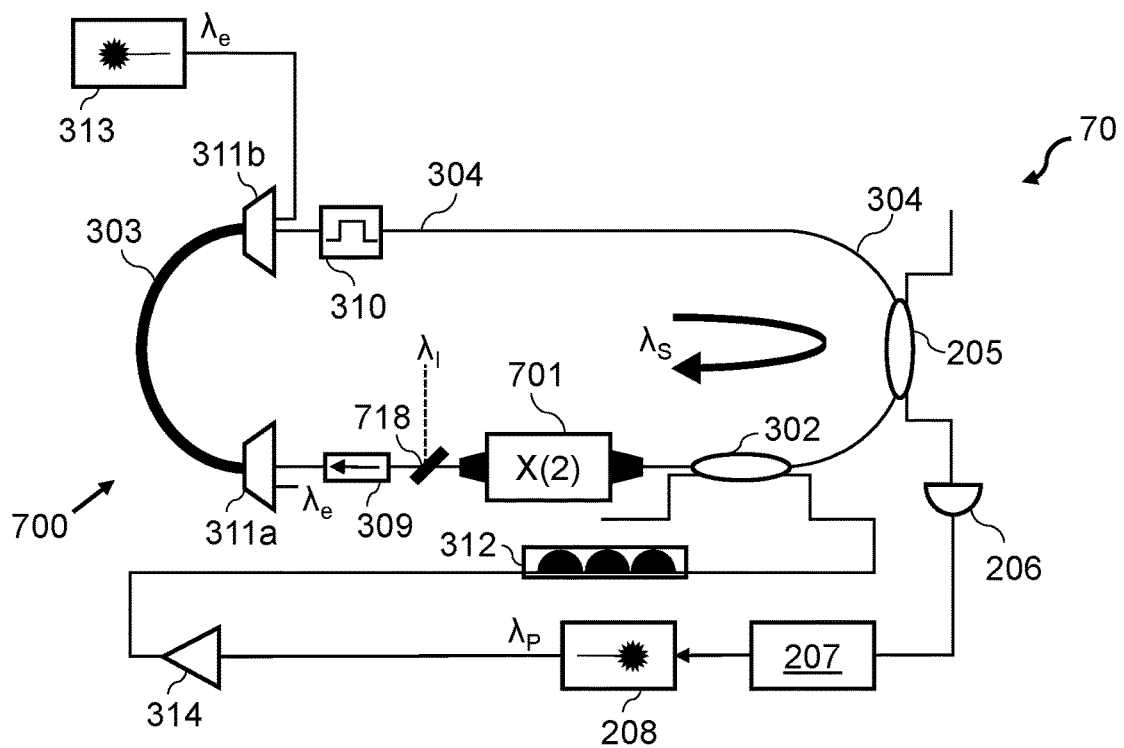
FIG. 7 shows an optical parametric oscillator in accordance with embodiments of the invention, which is configured to generate and output coherent idler light in addition to the generation of coherent signal light.

FIG. 7 shows an embodiment of an optical parametric oscillator 70 which is adapted to generate coherent light in the infrared region, where suitable laser gain media are not readily available or require substantial cooling. For instance coherent light near 3 µm and wavelength-tunable over approximately 200 nm, corresponding to lower-energy idler light, may be delivered at an output 71. A parametric gain element in the optical cavity 700 comprises a nonlinear optical medium 701 configured to perform parametric down-conversion of coherent pump light into lower-energy signal light and idler light. For example, coherent pump light at 1064 nm may be converted into lower-energy signal light near 1550 nm and idler light near 3 µm. The optical cavity 700 is arranged to be resonant for the signal light and may be arranged to be doubly resonant also with respect to the pump light.

A nonlinear optical crystal with quadratic nonlinearity may be provided as nonlinear optical medium 701 for parametric down-conversion. Non-limiting examples of such nonlinear optical crystals comprise bulk nonlinear crystals which are mounted in such a way that an entrance angle of the signal and pump light may be precisely controlled. This is usually achieved in a free-space optical cavity, or by expanding and subsequently shrinking, by a pair of beam expanders positioned at both sides of the crystal, a light beam which is coupled out of, and back into, an optical lightguide. Periodically poled crystals, e.g. on bulk chips or integrated waveguide chips, may be used to realize quasi phase-matching. Moreover, fiber-pigtailed nonlinear crystals are available and are preferable with regard to an all-fiber implementation. In a collinear conversion process, a color-sensitive beam splitter 718, e.g. a dichroic reflector, may be used to separate the idler light from the resonant signal light in the cavity and direct the so separated idler light to the output 71. In a non-collinear conversion process, the angle dependence of converted signal light and idler light may be used to spatially separate the idler light from both the signal light and the pump light. A non-resonant pump light may be absorbed by an intracavity spectral filter 310 and/or by a WDM coupler 311a, which are configured to transmit light in a spectral region corresponding to the signal light, e.g. a coherent signal light comprising a single optical frequency if a single-mode pump light source is provided or a plurality of optical frequencies if a pulsed pump light source for synchronous pumping is used.

In embodiments of the invention, various adjustments relating to the optical parametric oscillator may be performed by an intervening user, e.g. via a knob or user interface. The user may be presented with relevant information that is guiding the user through the adjustment procedures. Here, various adjustments may include one or more of the following: adjustments relating to a wavelength position of cavity resonances, adjustments relating to an amount of cavity detuning between a wavelength of the coherent pump light relative to a cavity resonance position, adjustments relating to polarization states (e.g. detecting by power changes through a polarizer-analyzer pair), adjustments relating to an intracavity power of the coherent pump light, adjustments relating to the parametric gain or parametric gain bandwidth, adjustments relating to the non-parametric gain or non-parametric gain bandwidth, adjustments relating to cavity roundtrip losses. Alternatively, or additionally, adjustments may be performed by a control or signal processing unit, e.g. a microcontroller, which is adapted to generate error signals in response to received detector signals and to send the error signal to specific actuators dealing with the aforementioned adjustments. A non-exhaustive list of specific actuators may include electronically addressable variable optical attenuators, light sources with output power and/or wavelength tuning capabilities, phase and/or amplitude modulators, piezo-actuators, translation stages with carrier structures for nonlinear optical crystals, a temperature-controlled crystal oven, fiber stretchers, rotatable polarization wave plates or wheels. Typically, the control unit is configured to read and execute instructions from a memory whose access addresses are communicated to the control unit. These instruction may be part of a software or hardware module that monitors and performs the user-free adjustments.

The embodiments of the present invention may be realized by upgrading existing optical cavities for the generation of coherent light. For instance, a non-parametric gain element of a solid-state or fiber laser may be replaced by, or altered into, a non-parametric gain element which is configured to have less non-parametric gain than the optical cavity roundtrip losses. More specifically, a gain fiber of a laser, e.g. fiber laser, may be shortened, e.g. by cutting a portion thereof. The remaining, shortened gain fiber may be spliced with a previously connected passive fiber of the cavity. Alternatively, the original gain fiber may be removed completely and replaced by a gain fiber which satisfies the non-parametric gain condition.

Another way to upgrade existing optical cavities of coherent light sources may include the step of inserting additional loss means into the cavity, e.g. a variable or fixed loss optical attenuator, or interchangeable or fixed neutral density filters. The upgrading process may further comprise the step of obtaining the passive cavity roundtrip losses, e.g. via a datasheet, a calibration file, by determining the losses based on known losses for each component of the cavity, or by directly measuring the optical losses of the cavity. A corresponding alteration of the non-parametric gain element, a change of the amount of additional losses, or the provision of a non-parametric gain element for replacement may be carried out in accordance with the obtained cavity roundtrip losses. For example, a length of the non-parametric gain element, e.g. gain fiber, may be reduced, or additional linear losses relative to the non-parametric gain element may be increased, e.g. by inserting lossy splices at one or both ends of a gain fiber. It is also possible to decrease the gain of the non-parametric element by cross-gain modulation with respect to a lasing wavelength, oscillating in a separate laser resonator, as explained in more detail with reference to FIG. 9 hereinbelow. With the latter approach, a 15 dB to 30 dB gain of a fiber amplifier can be tuned to provide much less gain for the coherent signal light, e.g. about 1.14 dB for an optical cavity with 30% roundtrip losses, so that low effective losses are obtainable for the optical cavity and saturation power levels for the non-parametric gain element are still sufficiently high to induce the nonlinear frequency conversion of coherent pump light into coherent signal light in the parametric gain element. Likewise, additional coupling elements for injection of the coherent pump light may be inserted, taken into account their excess losses.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Figure 8:
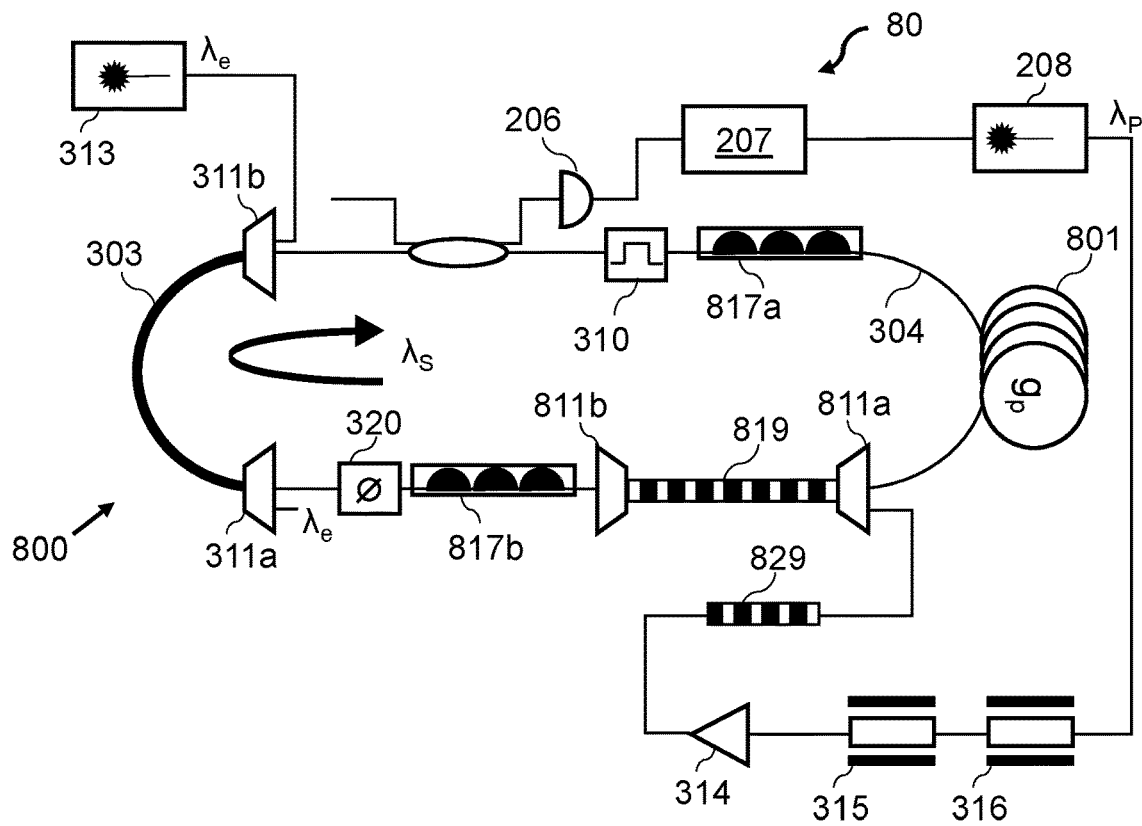
FIG. 8 shows an optical parametric oscillator in accordance with embodiments of the invention, which comprises a second sub-harmonic generating medium and is configured to generate a frequency comb as coherent signal light that does not spectrally overlap with primary coherent pump light that is to be injected into the optical cavity.

For example, it is possible to operate the invention in an embodiment wherein the optical parametric oscillator is configured to generate coherent signal light which comprises an optical frequency comb that does not spectrally overlap with a primary coherent pump light. This is illustrated in FIG. 8 for an optical parametric oscillator 80 in which the optical cavity 800 comprises a second sub-harmonic generating medium 819, e.g. a periodically poled single-mode optical fiber. The second sub-harmonic generating medium 819 is configured to convert primary coherent pump light into coherent second sub-harmonic light, e.g. coherent pump light at 775 nm is converted into coherent second sub-harmonic light at 1550 nm. This corresponds a degenerate optical down-conversion process in which the coherent second sub-harmonic light is phase-locked to the primary coherent pump light. A second pair of WDM coupler modules 811a-b is provided for coupling the primary coherent pump light into and out of the second sub-harmonic generating medium 819, and a set of polarization controlling devices 817a-b for adjusting a polarization state of the coherent second sub-harmonic light and the coherent signal light relative to an optical axis of the sub-harmonic generating medium 819. The coherent second sub-harmonic light now acts as secondary coherent pump light for the parametric conversion process in the parametric gain element 801, i.e. the parametric gain element is configured to convert the secondary pump light into the coherent signal light. For instance, the parametric gain element 801 comprises a dispersive optical lightguide with a quadratic or cubic optical nonlinearity, e.g. an optical fiber with Kerr-type nonlinearity and anomalous dispersion in a spectral region corresponding to the optical bandwidth of the coherent second sub-harmonic light. This allows for the formation of dissipative self-localized waveforms, e.g. temporal cavity solitons, above an intracavity power threshold value of the secondary pump light, which is directly linked to the launched intracavity power of primary coherent pump light. In these embodiments of the invention, the optical cavity 800 is arranged to be resonant for the optical frequency comb comprised by the coherent signal light and also for the secondary coherent pump light. In the embodiment of FIG. 8, a second harmonic generating medium 829, e.g. a periodically-poled lithium niobate crystal or waveguide, is arranged between the coherent pump light source 208 and the first WDM coupler 811a of the second pair of WDM couplers, which also acts as an input coupler for the primary coherent pump light. The second harmonic generating medium 829 is configured to generate the primary coherent pump light, e.g. coherent pump light at 775 nm, in a second harmonic generation process, when supplied with lower-energy pump light of the coherent pump light source 208, e.g. lower-energy, coherent pump light at 1550 nm. However, a suitable narrow-linewidth coherent pump light source which directly emits the higher-energy, primary coherent pump light, e.g. coherent pump light at 775 nm, can be provided instead so that the second harmonic generating medium 829 is not necessary.

Figure 9:
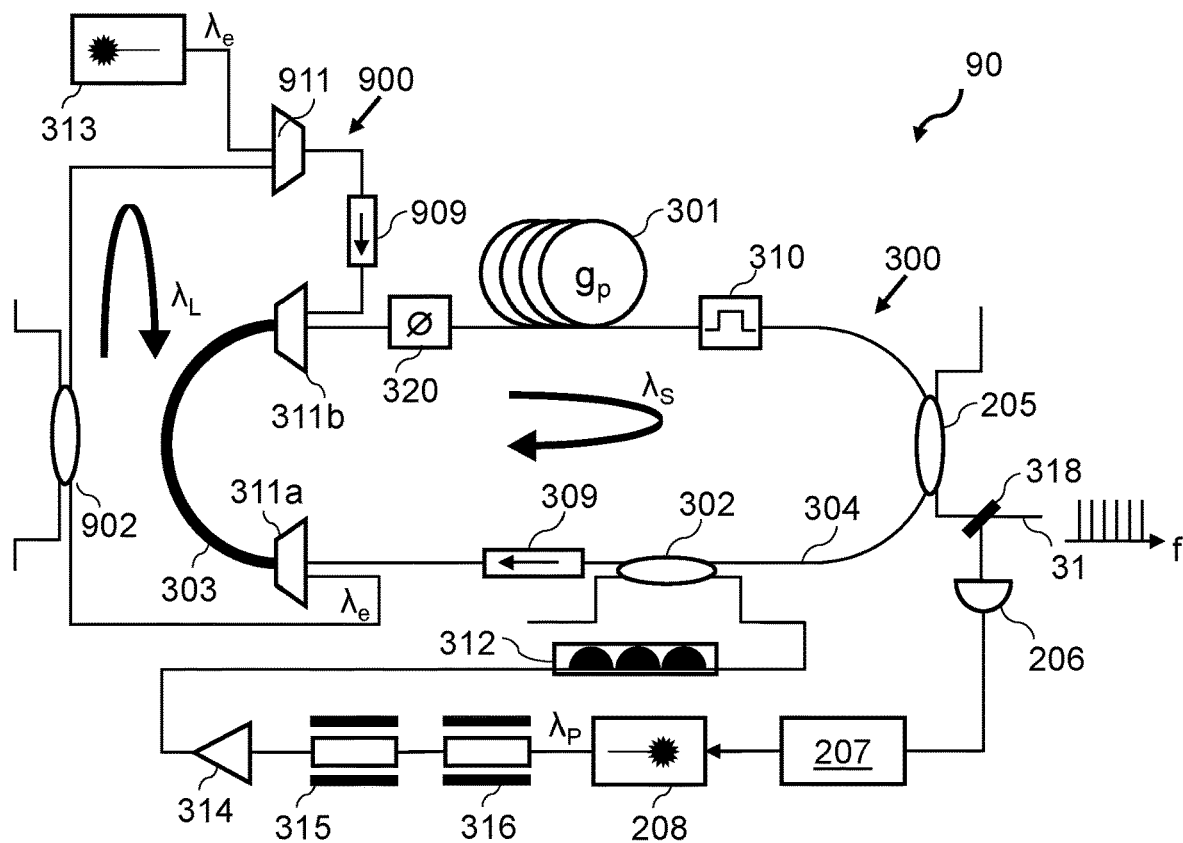
FIG. 9 shows an optical parametric oscillator in accordance with embodiments of the invention, which comprises a further optical feedback loop, sharing the non-parametric gain element with the main optical cavity for conversion of coherent pump light into coherent signal light.
Figure 14:
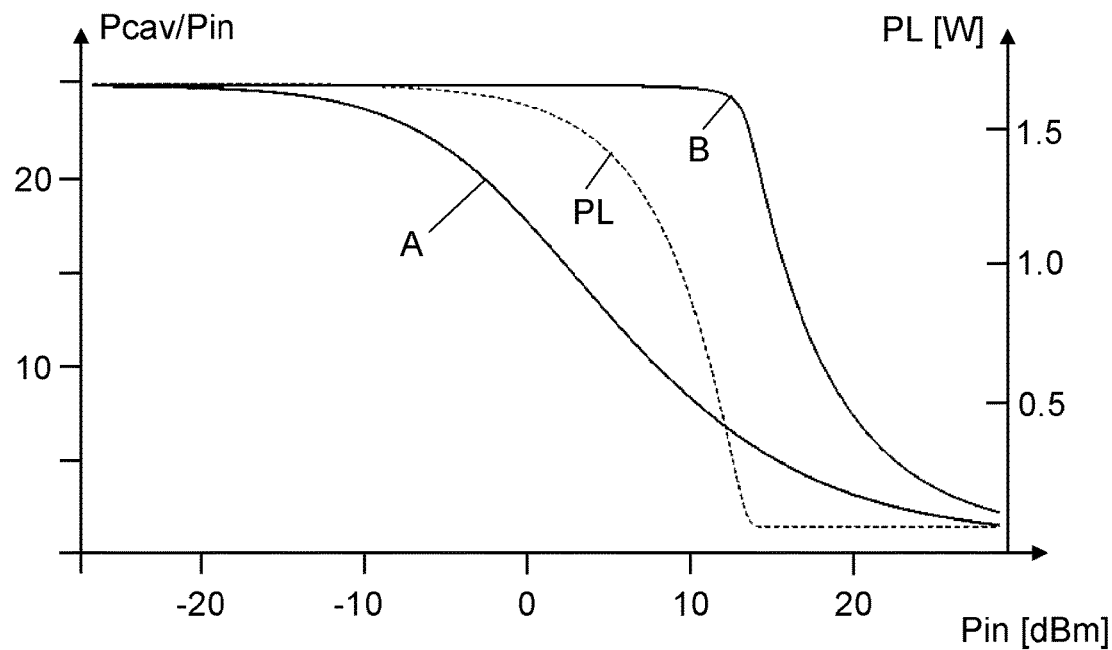
FIG. 14 and FIG. 15 show theoretically and experimentally obtained results for the intracavity power enhancement factor of the OPO cavity as a function of driving power injected into the cavity in the presence of an additional laser resonator that clamps the non-parametric gain.
Figure 15:
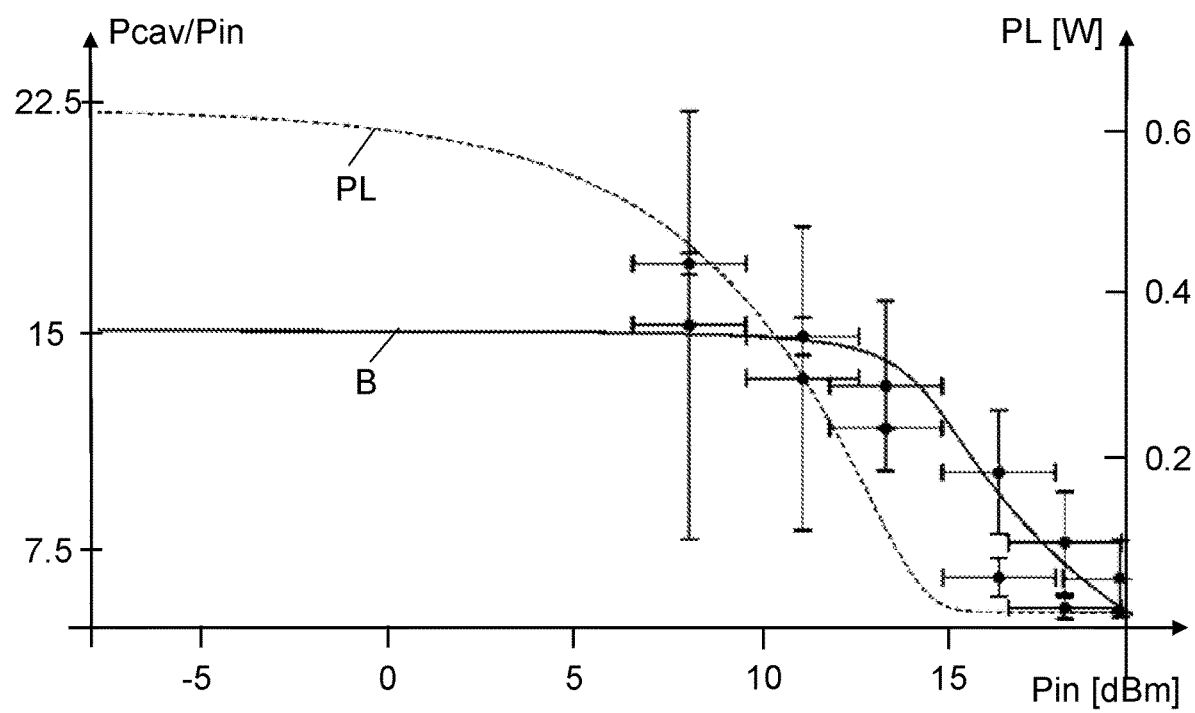

In FIG. 9, an embodiment of an optical parametric oscillator 90 is shown, which is an extension of the optical parametric oscillator 30 of FIG. 3. In addition to the optical cavity 30, the optical parametric oscillator 90 comprises a laser resonator 900. The non-parametric gain element 303 is shared by both the optical cavity 300 and the laser resonator 900. Preferably, the non-parametric gain spectrum of the non-parametric gain element 303 is homogenously broadened. In contrast to the optical cavity 300, the laser resonator 900 is configured to have optical roundtrip losses that are inferior to the non-parametric gain of the non-parametric gain element 303 so that active lasing is induced at a wavelength $\lambda_L$ not comprised by the optical bandwidth of the coherent signal light. The lasing wavelength $\lambda_L$ generally differs from the excitation wavelength $\lambda_e$ emitted by the excitation light source 313, e.g. cw laser diode, and may correspond to the wavelength at which the non-parametric gain spectrum peaks. An optical combiner 911, e.g. WDM coupler, is provided to combine the lasing wavelength $\lambda_L$ and the excitation wavelength $\lambda_e$ and a further optical isolator 909 ensures the unidirectionality of lasing in the laser resonator 900. An optional optical bandpass filter 310 in the optical cavity 300 may have its passband off-centered relative to the non-parametric gain spectrum peak so that a lasing wavelength at maximum non-parametric gain is located outside this passband, preventing lasing to be induced also in the optical cavity 300. The WDM coupler 311a and/or the optical isolator 309 prevent the laser light $\lambda_L$ from circulating also in the optical cavity 300. In the shared non-parametric gain element 303, the counter-propagating light paths of coherent signal light $\lambda_s$ and laser light $\lambda_L$ overlap. Therefore, the laser light $\lambda_L$ can be used to modulate the non-parametric gain experienced by the coherent signal light $\lambda_s$ via the cross-gain modulation effect in the non-parametric gain element. Selection of the laser resonator 900 losses (e.g. via the output coupler 902 and/or other lossy components of the laser resonator 900, such as a variable optical attenuator) allows one to clamp the non-parametric gain of the non-parametric gain element 303 to the losses of the laser resonator 900. This in turn makes a precise adjustment of the non-parametric gain experienced by the coherent signal light $\lambda_s$ below the cavity roundtrip losses possible, resulting in low effective cavity roundtrip losses. Typically, the optical power of the laser light $\lambda_L$ is larger than the optical power of the coherent signal light $\lambda_s$ to modulate the non-parametric gain for the coherent signal light by gain saturation and the modulated non-parametric gain for the coherent signal light is quasi-independent on the optical power inside the optical cavity 300. This gain-clamping behavior is further illustrated in FIG. 14 and FIG. 15, which show theoretically simulated and experimentally obtained results respectively. Curve "A" in FIG. 14 describes the case of an OPO cavity of finesse F=50, for which the additional laser resonator is absent and no gain-clamping of the non-parametric gain element is achieved. It is seen that the OPO cavity power enhancement factor Pcav/Pin, i.e. the ratio between intracavity peak power on resonance Pcav and the injected driving power Pin, quickly decreases for increasing driving powers as a result of gain saturation in the non-parametric gain element. In contrast thereto, an OPO cavity that shares its non-parametric gain section with the additional laser oscillator and having the same unsaturated finesse F=50 is characterized by an extended range of driving powers Pin over which the OPO cavity power enhancement factor Pcav/Pin remains substantially constant. This case is reflected by curve "B" in FIG. 14. The steep roll-off in curve "B" occurs at a driving power level where the laser power PL is approaching zero, i.e. no laser oscillation in the additional laser resonator can be sustained for such high driving powers. An experimental confirmation of the extended range of gain-stable driving powers is shown in FIG. 15, wherein a lower effective (unsaturated) finesse of approximately F=33 has been measured for the curve "B".

Figure 11:
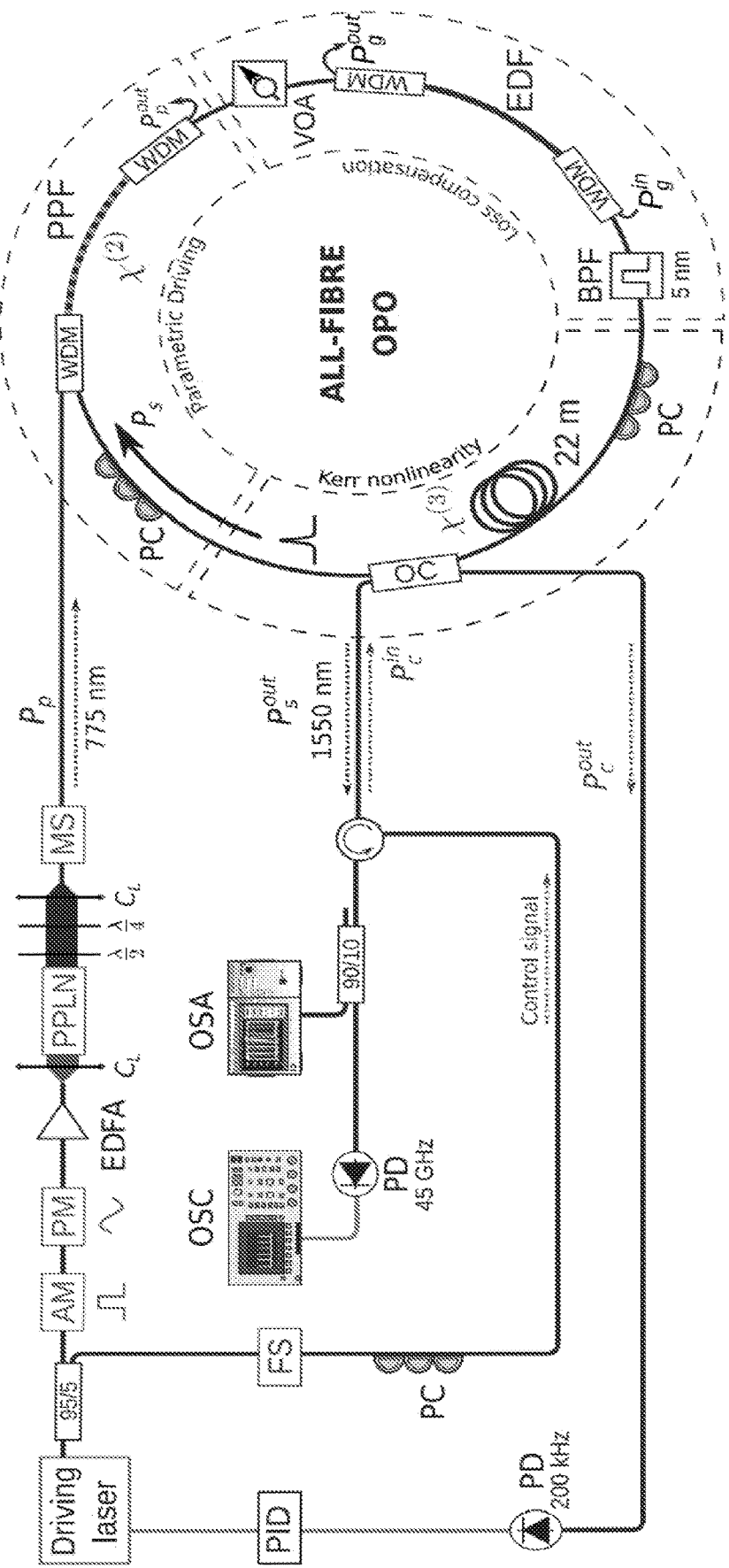
FIG. 11 shows a variant of the embodiment in FIG. 7, in which the optical parametric oscillator is configured as a single-resonant degenerate parametric oscillator and which comprises a further nonlinear section.

FIG. 11 illustrates a further embodiment of an optical parametric oscillator (OPO) in accordance with the invention. The synchronously driven, single-resonant degenerate OPO of the present embodiment is all-fiber and comprises a parametric driving section, a loss compensation section and a propagation section with additional Kerr-type nonlinearity. In addition to the OPO, the embodiment of FIG. 11 also shows optical input equipment which prepares the externally applied coherent pump light to which the cavity solitons are phase-locked and output equipment for analyzing the formed cavity solitons and for providing feedback stabilization control. The parametric driving section comprises the parametric gain element, here a periodically poled fiber (PPF), e.g. 27 cm long, which converts the coherent input light, e.g. at 775 nm wavelength, via a degenerate down-conversion process into the coherent signal light of the cavity soliton, e.g. coherent signal light at about 1550 nm wavelength, corresponding to the center frequency of the cavity soliton. The loss compensation section includes the non-parametric gain element for amplifying the coherent signal light of the generated cavity soliton, whereby intracavity losses are partially overcome. In the present embodiment an erbium doped fiber (EDF), e.g. 52 cm long and optically pumped with 2 W at 1480 nm, is used as the non-parametric gain element. The propagation section with additional Kerr-type nonlinearity contains a standard single mode fiber, e.g. 22 m long. The single-pass gain of the EDF is 35%, leading to an effective finesse of 122 at the coherent signal center wavelength (Q=2.6×10$^9$). The oscillation threshold for the formation of stable solitons has been theoretically predicted with the parametrically driven non-linear Schrödinger equation and is situated at 5.4 W of driving power for coherent input light at 775 nm. In experiments, short flat-top pulses, synchronized to the free spectral range of OPO cavity (9.2 MHz, at approximately 1550 nm), have been used to drive the OPO above threshold. The short flat-top pulses have the additional advantage of maintaining an average input power well below the saturation power of the intracavity EDF-based amplifier (600 mW). The input equipment comprises a frequency-doubling stage including periodically poled lithium niobate (PPLN). Prior to frequency-doubling, driving laser light at 1550 nm is amplitude modulated (AM) and boosted with an erbium doped fiber amplifier (EDFA). A lens (CL) is used to couple the light into a piece of fiber that connects to the OPO via a wavelength division multiplexer (WDM) input coupler. Two phase plates and a mode scrambler (MS) are used to limit polarization and modal losses. Additionally, the driving laser input light can be phase modulated (PM). A further WDM element removes the coherent input light after the parametric gain element. An output coupler (OC) is included in the OPO for coupling out a power fraction of the cavity soliton and its temporal and spectral properties can be further analyzed as indicated, e.g. using an optical spectrum analyzer (OSA), a fast photodiode (PD) and an oscilloscope (OSC). The OPO cavity is actively stabilized using a proportional-integral-derivative (PID) controller in combination with a counter-propagating beam that is frequency shifted (FS) from the driving laser. Intracavity amplified spontaneous emission (ASE) noise can be reduced by insertion of an optical bandpass filter (BPF) behind the EDF-based non-parametric gain element inside the OPO cavity. Besides, the BPF suppresses lasing in the OPO cavity at shorter wavelengths. A variable optical attenuator (VOA) can be used to adjust the intracavity power of the coherent signal light, e.g. by varying the round trip losses in the OPO cavity.

Figure 12:
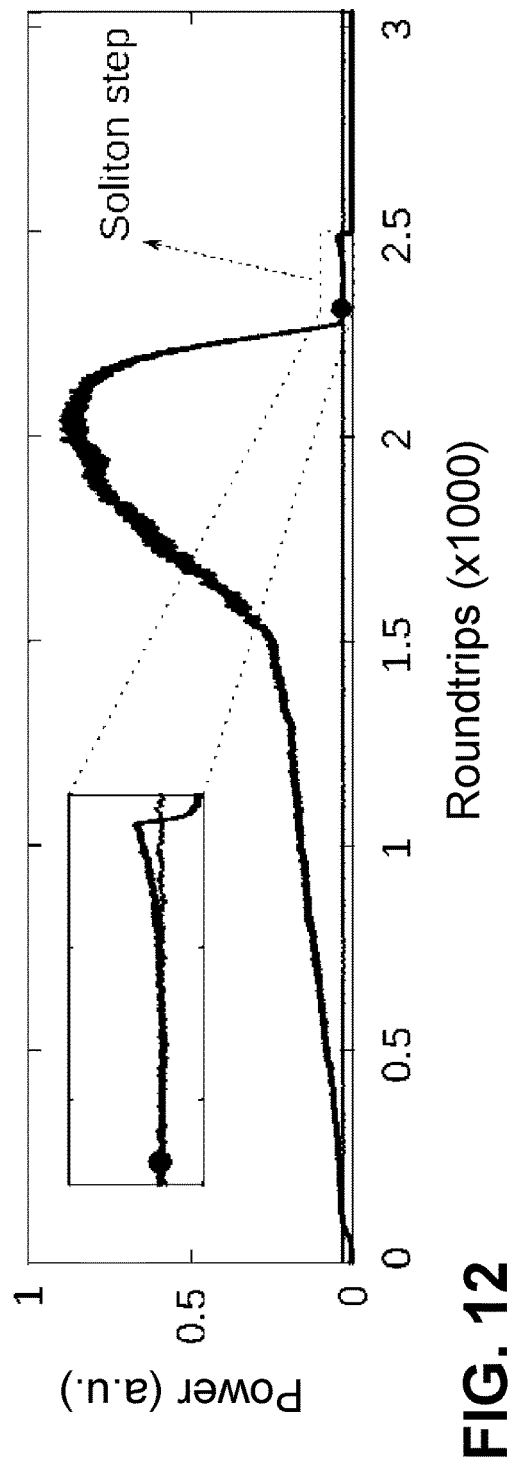
FIG. 12 is a cavity output power time trace obtained for the optical parametric oscillator of FIG. 11 when the driving laser frequency is swept through one of the oscillator resonances.

Experimental results for the OPO dynamics observed in response to a frequency sweep of the coherent driving laser (+230 kHz/ms), amplitude modulated into 650 ps long driving pulses of 10 W peak power, through a resonance of the OPO cavity are shown in FIG. 12. The time response signal (expressed in number of cavity roundtrips; time being indicative of cavity detuning), measured around 1550 nm at the output coupler OC, is reminiscent of that observed in externally pumped Kerr resonators. The signal average power gradually increases until it reaches the region of bistabilty, beyond which it drops suddenly, indicating the formation of self-localized structures. A small plateau emerges at that point and corresponds to the existence of a stable soliton branch (often called the soliton step in context of externally driven Kerr resonators, where pulses tend to merge one by one, leading to a staircase-shaped transmission curve). The soliton step in our experiments has a finite extension, while the theoretical predicted soliton branch grows indefinitely with increasing detuning. In the experiment, the soliton collapse is due to the 5-nm, flat-top, intracavity bandpass filter BPF: as the detuning is ramped up, so is the soliton's spectral width, such that the bandpass filter BPF eventually prevents stable soliton formation. Furthermore, background-free, stable short pulses, circulating in the OPO cavity, were observed at a feedback-stabilized setpoint (point in FIG. 12), corresponding to a phase detuning of about 3%. From autocorrelation traces (not shown), a FWHM pulse duration of 3.6 ps has been deduced.

It is an advantage of the present and similar or related embodiments of the invention that the frequency-doubled coherent pump light can easily be filtered out inside the OPO cavity or at the output, which may be of importance for at least some applications like soliton microcomb-based ranging. Additionally or alternatively, the frequency-doubled coherent pump light contrast can be harnessed for self-referencing, e.g. in metrology applications.

Figure 13:
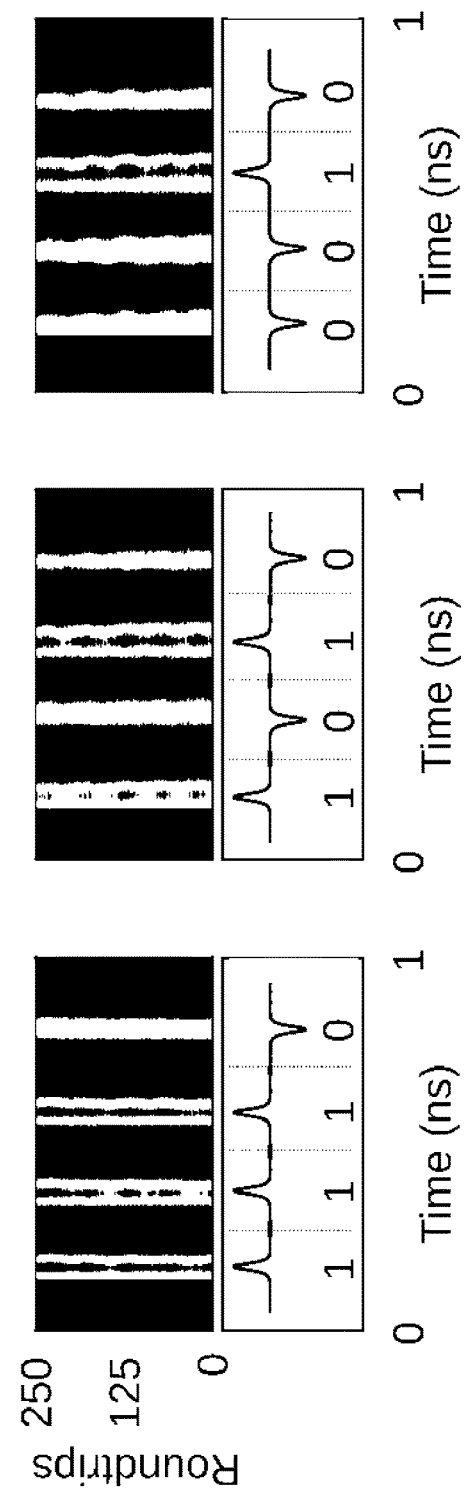
FIG. 13 shows different scans of cavity soliton time traces over many cavity roundtrips, obtained relative to four mutually excited cavity solitons in the optical parametric oscillator of FIG. 11, and their associated binary phases.

Next, an application of generating a random bit sequence is described, which uses the OPO in FIG. 11, or similar embodiments. The $Z_2$-symmetry of the parametrically driven nonlinear Schrödinger equation, of which the cavity solitons relating to FIG. 12 are a solution, allows the coexistence of two attractors with equal amplitude but opposite phase signature (in-phase and out-of-phase). When a cavity soliton is spontaneously excited, it has a 50% chance (randomly determined by quantum noise fluctuations) of phase-locking to the coherent pump light with one of the two possible phase relations. By exciting multiple cavity solitons and extracting their phases, a random sequence of bits can be generated. This has been demonstrated experimentally for the set-up described with reference to FIG. 11 by phase-modulating (PM) the beam of coherent pump light so as to excite a series of equally spaced (in time) cavity solitons. This is possible because the individual cavity solitons are attracted by respective phase maxima of the phase-modulated pump light. Preferably, a relatively low phase modulation frequency (e.g. 4.6 GHz corresponding to approximately 220 ps time separation between two successive cavity solitons) is chosen in order to resolve individual cavity solitons on the oscilloscope. The soliton pulses serve as a reference signal while a portion of the driving laser light, extracted prior to the frequency doubling, is used as a local oscillator for coherent detection on a fast photodetector (e.g. photodiode). Two or more cavity solitons can be excited in the OPO cavity, for which a detected amplitude value (peak or average) in the homodyne detection scheme takes one of two possible values (dictated by the respective cavity soliton phase relation when interfering with the local oscillator). FIG. 13 illustrates three scans of time traces obtained by coherent detection. Each scan comprises time traces of four excited cavity solitons over many cavity roundtrips. By assigning a binary value to each cavity soliton time trace, the different experimental scans are representative of distinct outcomes of a random trial, i.e. the binomial trial consisting of the random drawing of four independent bits, wherein each bit value ("0" or "1") has a 50% probability. More generally, the described experiment can be expanded to a method of generating random sequences of n bits, e.g. sequences of an n-bit random number, wherein the corresponding set-up containing the OPO is acting as a random number generator configured to generate and output sequences of n-bit random numbers.

Other applications of the OPO than the above-described random number generation are possible. For instance, the same OPO configuration as in the embodiment relating to FIG. 11 may be used to implement a coherent (i.e. phase-sensitive) Ising machine. Ising machines emulate spin-glass systems and are special-purpose computing devices that are well-suited to find solutions or good approximations to NP-hard combinatorial optimization problems (e.g. the travelling salesman problem). For the present OPO, the binary phases of individual cavity soliton pulses can be associated with two different spin states and an interconnected spin-network (e.g. with all-to-all connections) can be emulated in the OPO if each cavity soliton is provided with optical feedback that is dependent on the connection strength and the current binary phase relative to the set of cavity soliton to which it is connected. An exemplary practical implementation of the optical feedback mechanism for each of the set of cavity solitons is given in FIG. 1 of PETER L. MCMAHON, et al., "*A fully programmable* 100-*spin coherent Ising machine with all-to-all connections*", SCIENCE (Apr. 11, 2016), pp. 614-617. Therein, a field-programmable gate array (FPGA) is used to compute the feedback strengths for each cavity soliton online, using a coherent detection scheme to measure a fraction of each cavity soliton serving as computation inputs, while an external phase modulator and external intensity modulator (both not part of the optical cavity) modify the phase and intensity profile of each pulse in a pulse sequence delivered by a pulsed laser source in accordance with the corresponding feedback strength computed by the FPGA. The pulsed laser source is synchronized with the optical cavity solitons circulating in the optical cavity such that the feedback-modulated pulses from the pulsed lasers source, when injected into the optical cavity, are overlapping with the corresponding cavity solitons, thus enabling the mutual interaction between individual cavity solitons. In embodiments of the invention, this feedback mechanism can be further improved by directly inserting the phase and intensity modulators into the optical cavity. Whereas this direct insertion is prohibitive in the prior art in terms of the too strong increase of the OPO oscillation threshold, any additional insertion losses upon placement of the phase and intensity modulator in the optical cavity are compensable through the non-parametric gain element, thereby leaving the oscillation threshold unaffected in embodiments of the invention.

Figure 16:
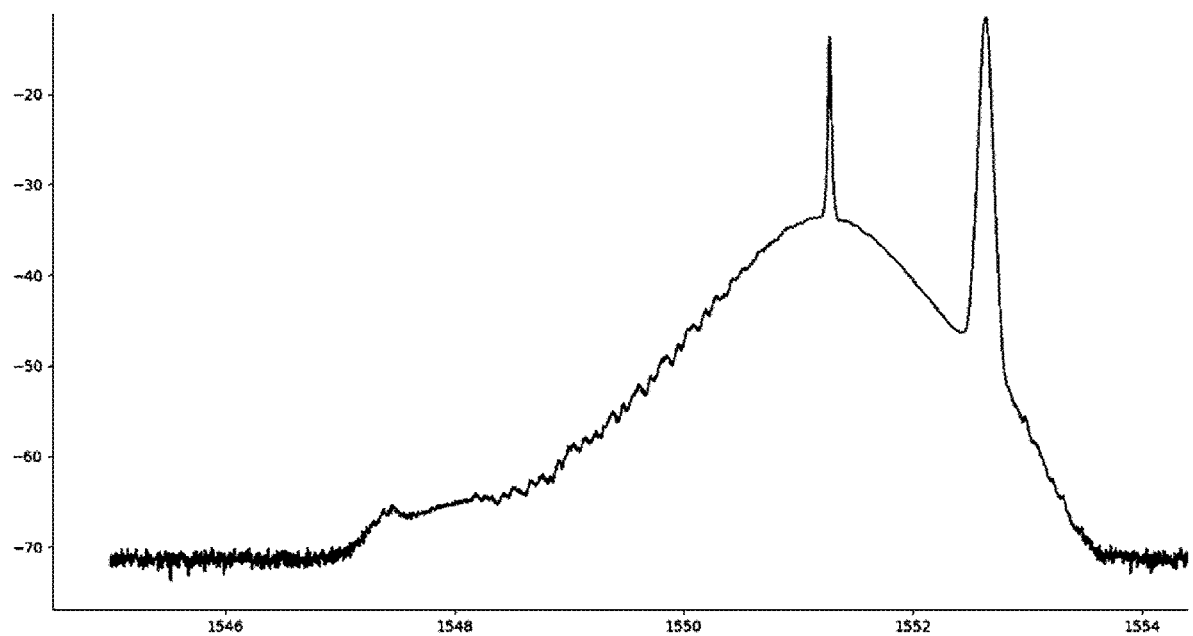
FIG. 16 shows a spectral record representative of an OPO cavity, in which a cavity soliton and a lasing line coexist without mutual interference.

Briefly referring to FIG. 16, a spectral record is shown which illustrates the possibility of a Kerr-type cavity soliton coexisting with a lasing line. Without being limited thereto, the spectral record is representative of the light output from any one of the OPO cavities depicted in FIG. 3,5,9 or 11. The spectral record was measured by an optical spectral analyzer which did not have sufficiently fine resolution to resolve the individual frequency teeth of the comb induced by the cavity soliton. For the same reason it is not possible to distinguish, in the same spectral record, the frequency detuning between the lasing line, centered on a cold cavity mode around 1553 nm, and the discrete frequency components of the Kerr-type cavity soliton, as a consequence of the nonlinear Kerr effect. A plateau identifiable in the wavelength range between 1546 nm and 1548 nm in the spectral record can be attributed to the ASE noise floor of the intracavity amplifying non-parametric gain element which has been supplemented with a 5 nm wide bandpass filter (1547 nm to 1552 nm) in order to limit the impact of ASE noise. The peak at 1551 nm corresponds to the unfiltered wavelength of the coherent pump light which drives and sustains the cavity soliton.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An optical parametric oscillator comprising an optical cavity, said optical cavity comprising:
   a non-parametric gain element for amplifying said coherent signal light to only partially compensate for passive optical roundtrip losses of the optical cavity, thereby obtaining lower effective roundtrip losses for the optical cavity,
   a parametric gain element for converting coherent pump light into coherent signal light through an instantaneous nonlinear optical interaction, a parametric gain of the parametric gain element depending on an intracavity optical power of said coherent pump light,
   wherein the optical parametric oscillator further comprises an optical power regulator configured for adjusting an intracavity optical power of said coherent pump light above a threshold value, where the parametric gain is balancing said effective roundtrip losses in a spectral region occupied by the signal light, thereby inducing sustained oscillations of the signal light in the optical cavity,
   wherein the non-parametric gain element is configured to have a limited non-parametric gain over a gain bandwidth of the parametric gain element, which is less than the passive optical roundtrip losses in said gain bandwidth, and
   wherein the optical cavity is configured to be resonant for the coherent signal light.

2. The optical parametric oscillator according to claim 1, wherein the parametric gain element comprises a dispersive optical lightguide with quadratic or cubic optical nonlinearity and the coherent signal light corresponds to a self-localized dissipative waveform composed of a plurality of frequency teeth of an optical frequency comb.

3. The optical parametric oscillator according to claim 2, further comprising a sub-harmonic generating medium disposed in said optical cavity, for converting primary coherent pump light into secondary coherent pump light,
   wherein a frequency ratio of the secondary coherent pump light to the primary coherent pump light is 1:2, and
   wherein said secondary coherent pump is directed to the parametric gain element for converting said secondary pump light into said coherent signal light corresponding to a self-localized dissipative waveform composed of a plurality of frequency teeth of an optical frequency comb.

4. The optical parametric oscillator according to claim 2, further comprising a second harmonic generating medium for generating a further optical frequency comb with center frequency that is twice of a center frequency associated with the self-localized dissipative waveform.

5. The optical parametric oscillator according to claim 4, wherein the second harmonic generating medium comprises a periodically poled optical fiber.

6. The optical parametric oscillator according to claim 1, wherein the parametric gain element comprises a nonlinear optical medium with quadratic optical nonlinearity for converting coherent pump light simultaneously into lower-energy coherent signal light and lower-energy coherent idler light, and
   wherein the optical parametric oscillator is adapted for extracting at least a portion of said coherent idler light from the optical cavity.

7. The optical parametric oscillator according to claim 1, further comprising a light source for generating coherent pump light and a coupling element disposed in the optical cavity, for directing coherent pump light into the optical cavity.

8. The optical parametric oscillator according to claim 7, wherein the light source is a continuous-wave laser with linewidth approximately equal to, or smaller than, a resonance linewidth associated with a resonant longitudinal mode of the optical cavity, or a pulsed laser configured to generate coherent pump light pulses at a repetition rate corresponding to a roundtrip time of the optical cavity multiplied by a rational number.

9. The optical parametric oscillator according to claim 1, further comprising cavity detuning mechanism for adjusting and controlling an amount of detuning of a resonant longitudinal mode of the optical cavity relative to a center wavelength of the coherent pump light.

10. The optical parametric oscillator according to claim 1, further comprising a phase modulator for modulating a phase of said coherent pump light before entering the optical cavity and/or amplitude modulator for modulating an amplitude of said coherent pump light before entering the optical cavity.

11. The optical parametric oscillator according to claim 1, wherein the non-parametric gain element comprises a rare-earth ion-doped fiber amplifier.

12. The optical parametric oscillator according to claim 1, further comprising an optical component for adjusting the passive optical roundtrip losses of the optical cavity.

13. The optical parametric oscillator according to claim 1, wherein the optical cavity of the optical parametric oscillator is implemented in free-space, in fiber, in a photonic integrated circuit, or combinations thereof.

14. The optical parametric oscillator according to claim 1, wherein the optical power regulator comprises one or more of the following:
   a laser source configured for generating the coherent pump light at different output power levels,
   an optical amplifier having adjustable optical gain,
   an amplitude modulator or a variable optical attenuator, positioned in a light path of the coherent pump light exterior to the optical cavity,
   an optical input coupler arranged inside the optical cavity and having an adjustable input power coupling ratio, and
   a variable optical attenuator arranged inside the optical cavity.

15. A method for generating coherent signal light in an optical cavity, comprising:
   providing said optical cavity with coherent pump light, said optical cavity being resonant for the signal light to be generated,
   converting said coherent pump light into coherent signal light through a parametric optical mixing process,
   amplifying said coherent signal light in a non-parametric optical amplification process to only partially compensate for passive optical roundtrip losses of said optical cavity, thereby obtaining lower effective roundtrip losses for the optical cavity,
   adjusting an intracavity optical power of said coherent pump light above a threshold value, where a parametric gain for the parametric optical mixing process is balancing said effective roundtrip losses in a spectral region occupied by the signal light, thereby inducing sustained oscillations of the signal light in the optical cavity,
   wherein a non-parametric gain for said non-parametric optical amplification process is limited to be less than the passive optical roundtrip losses over a gain bandwidth associated with the parametric optical mixing process.

16. A method for building an optical parametric oscillator, the method comprising:
   providing an existing optical cavity and an optical power regulator for adjusting an intracavity optical power of coherent pump light injectable into the existing optical cavity,
     wherein the existing optical cavity includes a parametric gain element for converting coherent pump light into coherent signal light through an instantaneous nonlinear optical interaction, a parametric gain of the parametric gain element depending on said intracavity optical power of said coherent pump light, where sustained oscillations of the coherent signal light are induced in the optical cavity above a threshold value of said intracavity optical power,
   obtaining the passive optical roundtrip losses of said existing optical cavity in a spectral region corresponding to a gain bandwidth of the parametric gain element, and
   upgrading the existing optical cavity by:
     inserting a non-parametric gain element for amplifying said coherent signal light and configuring the non-parametric gain element to have a non-parametric gain less than the obtained passive optical roundtrip losses in said spectral region if the existing cavity is without a non-parametric gain element, or else if the existing cavity comprises a non-parametric gain element for amplifying said coherent signal light gain, modifying that non-parametric gain element to have a non-parametric gain less than the obtained passive optical roundtrip losses in said spectral region, or inserting an additional optical attenuator to modify the obtained passive optical roundtrip losses in said spectral region such that a non-parametric gain of that non-parametric gain element is less than the modified passive optical roundtrip losses in said spectral region, and
     adjusting a length of the existing optical cavity to make it resonant for the converted coherent signal light.

* * * * *